(12) United States Patent
Bocklet et al.

(10) Patent No.: US 9,972,313 B2
(45) Date of Patent: May 15, 2018

(54) INTERMEDIATE SCORING AND REJECTION LOOPBACK FOR IMPROVED KEY PHRASE DETECTION

(71) Applicant: Intel Corporation, Santa Clara, CA (US)

(72) Inventors: Tobias Bocklet, Munich (DE); Adam Marek, Gdansk (PL); Tomasz Dorau, Gdansk (PL); Przemyslaw Sobon, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/057,695

(22) Filed: Mar. 1, 2016

(65) Prior Publication Data

US 2017/0256255 A1    Sep. 7, 2017

(51) Int. Cl.
*G10L 15/00* (2013.01)
*G10L 15/04* (2013.01)
*G10L 15/10* (2006.01)
*G10L 17/22* (2013.01)
*G10L 15/193* (2013.01)
*G06F 17/30* (2006.01)
*G10L 15/02* (2006.01)

(52) U.S. Cl.
CPC ........ *G10L 15/193* (2013.01); *G06F 17/3053* (2013.01); *G06F 17/30746* (2013.01); *G10L 15/10* (2013.01); *G10L 17/22* (2013.01); *G10L 2015/025* (2013.01)

(58) Field of Classification Search
None
See application file for complete search history.

(56) References Cited

U.S. PATENT DOCUMENTS

| | | | |
|---|---|---|---|
| 6,138,095 A | 10/2000 | Gupta et al. | |
| 6,205,424 B1 | 3/2001 | Goldenthal et al. | |
| 7,139,714 B2* | 11/2006 | Bennett | G06F 17/3043 704/270.1 |
| 7,457,748 B2* | 11/2008 | Nefti | G10L 15/10 704/240 |
| 7,487,091 B2* | 2/2009 | Miyazaki | G10L 15/08 704/231 |
| 7,603,278 B2* | 10/2009 | Fukada | G10L 13/06 345/473 |
| 7,720,683 B1* | 5/2010 | Vermeulen | G10L 15/22 704/235 |
| 8,255,215 B2* | 8/2012 | Li | G10L 15/02 704/224 |

(Continued)

OTHER PUBLICATIONS

Non-Final Office Action for U.S. Appl. No. 14/950,670, dated Feb. 17, 2017.

(Continued)

*Primary Examiner* — Paras D Shah
*Assistant Examiner* — Thuykhanh Le
(74) *Attorney, Agent, or Firm* — Green, Howard & Mughal LLP

(57) ABSTRACT

Techniques related to key phrase detection for applications such as wake on voice are discussed. Such techniques may include intermediate scoring of a state or states of a key phrase model and/or a backward transition or rejection loopback from a state of the key phrase model to a rejection model to reduce false accepts based on received utterances.

24 Claims, 8 Drawing Sheets

(56) References Cited

U.S. PATENT DOCUMENTS

| | | | |
|---|---|---|---|
| 8,527,271 B2* | 9/2013 | Wandinger | G10L 15/04 704/246 |
| 8,818,802 B2* | 8/2014 | Fastow | G06K 9/00979 704/235 |
| 9,070,367 B1* | 6/2015 | Hoffmeister | G10L 15/187 |
| 9,299,338 B2* | 3/2016 | Kato | G10L 13/08 |
| 9,368,105 B1 | 6/2016 | Freed et al. | |
| 9,401,140 B1 | 7/2016 | Weber et al. | |
| 9,646,613 B2* | 5/2017 | Blouet | G10L 17/22 |
| 2002/0087314 A1 | 7/2002 | Fischer et al. | |
| 2007/0285505 A1 | 12/2007 | Korneliussen | |
| 2010/0198598 A1 | 8/2010 | Herbig et al. | |
| 2010/0324900 A1* | 12/2010 | Faifkov | G10L 15/12 704/254 |
| 2012/0166194 A1* | 6/2012 | Jung | G10L 15/02 704/238 |
| 2012/0245934 A1 | 9/2012 | Talwar et al. | |
| 2013/0289994 A1 | 10/2013 | Newman et al. | |
| 2014/0025379 A1* | 1/2014 | Ganapathiraju | G10L 15/08 704/255 |
| 2014/0058731 A1* | 2/2014 | Tyagi | G10L 15/063 704/243 |
| 2014/0079297 A1* | 3/2014 | Tadayon | G06K 9/00 382/118 |
| 2014/0129224 A1* | 5/2014 | Chien | G10L 15/142 704/249 |
| 2014/0136200 A1 | 5/2014 | Winter et al. | |
| 2014/0172428 A1* | 6/2014 | Han | G10L 17/16 704/250 |
| 2014/0200890 A1 | 7/2014 | Kurniawati et al. | |
| 2014/0278435 A1* | 9/2014 | Ganong, III | G10L 15/22 704/275 |
| 2014/0337030 A1* | 11/2014 | Lee | G10L 15/08 704/251 |
| 2014/0337031 A1* | 11/2014 | Kim | G06F 3/167 704/256.5 |
| 2014/0358539 A1* | 12/2014 | Rao | G10L 15/063 704/243 |
| 2015/0025890 A1 | 1/2015 | Jagatheesan et al. | |
| 2015/0066495 A1 | 3/2015 | Zhang et al. | |
| 2015/0073795 A1 | 3/2015 | Tan | |
| 2015/0081296 A1* | 3/2015 | Lee | G10L 15/20 704/239 |
| 2015/0095027 A1 | 4/2015 | Parada San Martin et al. | |
| 2015/0154953 A1 | 6/2015 | Bapat et al. | |
| 2015/0279358 A1* | 10/2015 | Kingsbury | G10L 15/083 704/257 |
| 2015/0302847 A1* | 10/2015 | Yun | G10L 15/02 704/251 |
| 2015/0340032 A1 | 11/2015 | Gruenstein | |
| 2015/0371631 A1* | 12/2015 | Weinstein | G10L 15/285 704/256.4 |
| 2015/0371633 A1* | 12/2015 | Chelba | G10L 15/063 704/240 |
| 2016/0066113 A1 | 3/2016 | Elkhatib et al. | |
| 2016/0071516 A1* | 3/2016 | Lee | G10L 15/18 704/251 |
| 2016/0098999 A1* | 4/2016 | Jacob | G10L 19/00 704/201 |
| 2016/0111086 A1* | 4/2016 | Ziolko | G10L 15/14 704/240 |
| 2016/0180839 A1* | 6/2016 | Tomita | G10L 15/02 704/240 |
| 2016/0188573 A1* | 6/2016 | Tang | G06F 17/2775 704/9 |
| 2016/0189706 A1* | 6/2016 | Zopf | G10L 15/063 713/320 |
| 2016/0379632 A1* | 12/2016 | Hoffmeister | G10L 15/18 704/253 |
| 2017/0004824 A1 | 1/2017 | Yoo et al. | |

OTHER PUBLICATIONS

Chen, et al., "Small-Footprint Keyword Spotting Using Deep Neural Networks", 2014 IEEE International Conference on Acoustics, Speech and Signal Processing (ICASSP), May 4-9, 2014

Rose, et al., "A Hidden Markov Model Based Keyword Recognition System", 1990 ICASSP-90, vol. 1, 1990 International Conference on Acoustics, Speech, and Signal Processing, Apr. 3-6, 1990, 129-132.

Zhang, et al., "Unsupervised Spoken Keyword Spotting via Segmental DTW on Gaussian Posteriorgrams", in Proceedings of Automatic Speech Recognition & Understanding Workshop (ASRU 2009), IEEE, 2009, Merano, Dec. 2009, 398-403.

International Search Report & Written Opinion dataed Apr. 28, 2017 for PCT Patent Application No. PCT/US17/14435.

* cited by examiner

INTERMEDIATE SCORING AND REJECTION LOOPBACK FOR IMPROVED KEY PHRASE DETECTION

BACKGROUND

Key phrase or hot word detection systems may be used to detect a word or phrase or the like, which may initiate an activity by a device. For example, the device may wake (e.g., transition from a low power or sleep mode to an active mode) based on the detection of a particular word or phrase. Such wake-on-voice or key phrase detection systems may focus on detection of a specified phrase in order to wake the device with restricted memory and compute power. It may be the goal of such systems to minimize two possible error types: false rejects (e.g., falsely rejecting a correct phrase) and false accepts (e.g., falsely accepting a wrong phrase). In particular, such false accepts may be more likely to occur when a portion of an uttered phrase matches or is phonetically similar to the key phrase while another portion of the uttered phrase does not match or is not phonetically similar.

As such, existing techniques may provide relatively high false positive rates particularly when a portion of a key phrase has been uttered. Such problems may become critical as the desire to implement key phrase detection systems such as wake on voice systems becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
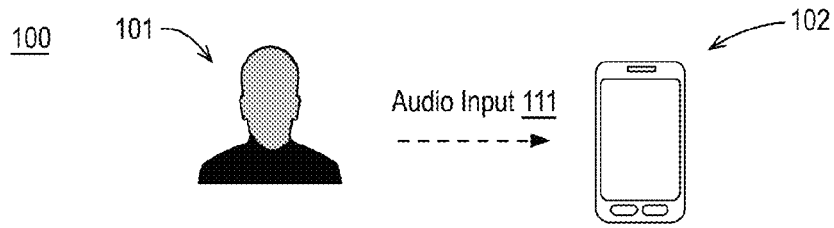
FIG. 1 is an illustrative diagram of an example setting for providing key phrase detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to key phrase detection with reduced false accepts for applications such as wake on voice.

As described above, key phrase or hot word detection systems may be used to detect a word or phrase or the like, which may initiate an activity by a device such as waking the device from a low power or sleep mode to an active mode based on detection of the key phrase. As used herein, the term key phrase may indicate any audio indicator or acoustic event to be detected such as a phrase, a word, or a group of phones or phonetic units, or an audio or acoustic event such as a baby's cry, a scream, or the like. Furthermore, the key phrase may be predetermined for use by the system such that detection of a predetermined key phrase may be provided. In an embodiment, an energy based voice activation detection may detect speech or some form of audio input and key phrase detection as discussed herein may be initiated based on the voice activation detection.

Also as described, key phrase or hot word detection systems may suffer from false rejects and false accepts. For example, some false accepts may occur with utterances that are phonetically similar to the defined key phrase and with utterances that are partially correct. For example, a partially correct utterance for the key phrase "Hello Computer" would include an utterance including "Hello" or "Computer". False accepts may typically be of two types. First, false accepts may occur when a first part (e.g., word or syllable(s)) of the utterance is correct or is phonetically similar to the key phrase and the system falsely accepts the utterance although the remaining part of the utterance is incorrect. Such false accepts may be provided when the second part of the utterance is phonetically similar to the remaining part of the key phrase (although ultimately incorrect) or when the detection system or model does not properly handle the key phrase and utterance comparison. Furthermore, false accepts may occur when the second or final part of the utterance is correct or is phonetically similar to the key phrase and acceptance is determined even though the first portion of the utterance was incorrect. Such false accepts may be more common when the first part of the key phrase is very short such that it may be more or less bypassed (e.g., it does not weigh heavily in the key phrase scoring).

In some embodiments, the first type of false accepts (e.g., a first part of an utterance is correct and a second part is incorrect) may be reduced by providing a rejection loopback or backward transition or the like to a rejection model from an intermediate state of a key phrase model. For example, the rejection model may include a single state rejection model with a transition to the key phrase model, which may include multiple states interconnected by transitions. The scores of the single state of the rejection model and multiple states of the key phrase model may be maintained at each time instance. For the first state of the key phrase model, the transition from the single state of the rejection model may provide, at each time instance, for the first state to generate it's score by adding a self loop score corresponding to the first state (e.g., a single self loop score or a maximum of multiple self loop scores) to a maximum of the score of the first state at the prior time instance and the score provided by the transition (e.g., the score of the single state of the rejection model at the prior time instance). Similarly, each transition interconnecting the multiple states of the key phrase model may provide the receiving state with a choice between updating the state with the previous score (e.g., from a prior time instance) from the state or the score transitioned to the state (e.g., from a prior time instance for the transitioning state) based on which is greater. Such updating may including adding a maximum self loop score of the state to the maximum of the previous score of the state and the transitioned score.

The intermediate state of the key phrase model providing the backward transition may, in some examples, be after a word or the like of the predetermined key phrase. The discussed loopback or transition to the rejection model may provide for updating the single state of the rejection model by adding a maximum self loop score of the single state to the maximum of the previous score of the single state and the (backward) transitioned score. Such updating may provide for the rejection model to have at least the same score as the transitioning state of the key phrase model, which may reduce or eliminate the difference between them. For example, both the single state of the rejection model and the next state of the key phrase model may be provided (e.g., via a transition) with the score from the intermediate state of the key phrase model. Such backward transitioning to the single state of the rejection model may provide, as scoring continues, in combination with the requirement that a scoring state (e.g., typically the final state) of the key phrase model exceeds the single state of the rejection model that a second or later portion of an utterance also matches or is phonetically similar to the second or later portion of the predetermined key phrase.

Such techniques may thereby require that first and second parts (or more) of the key phrase are spoken. Using such techniques, false accepts whereby the first part of the utterance meets the first part of the key phrase model and the second part does not may be greatly reduced or eliminated.

For example, as discussed further herein, a start state based rejection model having a single state and a key phrase model (e.g., representing a predetermined key phrase) having multiple states may be updated based on scores of sub-phonetic units representative of received audio input. A transition from a particular state of the key phrase model to the single state of the rejection model and to a next state of the key phrase model may be provided. As used herein, the term transition may provide the score from one state to another state. Such a transition may eliminate or reduce the difference between the rejection model and the key phrase model as discussed. The single state of the rejection model and states of the key phrase model may be updated based on subsequent scores of sub-phonetic units and the provided transitions. Such updating may provide a rejection likelihood score corresponding to the single state of the rejection model and a key phrase likelihood score corresponding to the key phrase model (e.g., typically corresponding to a final state of the key phrase model). Whether the received audio input is associated with the predetermined key phrase may be determined based on the rejection likelihood score and the key phrase likelihood score. For example, a log likelihood score based on the rejection likelihood score and the key phrase likelihood score may be determined and compared to a threshold to determine whether the key phrase has been detected. Such determination of whether the received audio input is associated with the predetermined key phrase may be provided at each time instance, for example.

In some embodiments, the second type of false accepts (e.g., a first, lowly weighted, part of an utterance is incorrect and a second part is correct) may be reduced by providing intermediate scoring of the key phrase model. As discussed, a rejection model may include a single state rejection model with a transition to the key phrase model, which may include multiple states interconnected by transitions. In some examples, the start state based rejection model and the key phrase model (e.g., representing a predetermined key phrase) may be updated based on scores of sub-phonetic units representative of received audio input. A rejection likelihood score may be determined based on the updated start state based rejection model. For example, the rejection likelihood score may correspond to the score of the single state of the rejection model. Furthermore, an overall key phrase likelihood score may be determined. For example, the overall key phrase likelihood score may be a minimum of a first likelihood score associated with a first state (e.g., an intermediate state) of the key phrase model and a second likelihood score associated with a second state (e.g., a final state) of the key phrase model. The first and second likelihood scores may be retained maximum scores over a particular time period, for example. Furthermore, the first and second states of the key phrase model may be selected as representative states of words or the like of the key phrase and may be described as scoring states or the like. Whether the received audio input is associated with the predetermined key phrase may be determined based on the rejection likelihood score and the overall key phrase likelihood score. By taking the minimum of the two (or more) likelihood scores of such scoring states to determine the overall key phrase likelihood score, a verification may be made that both the first part (or parts) of the key phrase (e.g., by scoring an earlier state or states of the key phrase model) and the overall key phrase (e.g., by scoring an later or final state of the key phrase) have been uttered. For example, a log likelihood score based on the rejection likelihood score and the overall key phrase likelihood score and may be compared to a threshold to determine whether the key phrase has been detected.

As discussed, some false accepts (e.g., a first part of an utterance is correct and a second part is incorrect) may be reduced by providing a rejection loopback or backward transition to a rejection model from an intermediate state of a key phrase model and other false accepts (e.g., a first part of an utterance is incorrect and a second part is correct) may be reduced by providing intermediate scoring of the key phrase model. In an embodiment, rejection loopback or backward transition techniques and intermediate scoring techniques may be combined or provided together to reduce both such false accepts. Such techniques, implemented together or separately, may significantly reduce false accepts and false rejects of key phrase or hot word detection systems.

As discussed, the start state based rejection model and the key phrase model may be updated or scored or the like based on scores of sub-phonetic units representative of a received audio input. In some embodiments, a time series of scores of sub-phonetic units may be generated based on a time series of feature vectors representative of received audio input that may include input speech. For example, audio input that may include an input speech stream or the like may be received via a microphone and the resultant audio data may be sampled over time to generate extracted coefficients such as Mel frequency cepstrum coefficients (MFCCs) or the like. Multiple sets of MFCCs (e.g., attained over time) may be stacked to form a feature vector such as a multi-dimensional feature vector. Furthermore, such feature vectors may be generated over time to provide a time series of feature vectors representative of the received audio that may include speech. Such feature vectors may be scored based on an acoustic model such as a deep neural network (DNN) or the like to provide the scores of the sub-phonetic units. For example, at least some of the sub-phonetic scores may be associated with a likelihood a particular triphone has been spoken.

Based on the scores of sub-phonetic units (e.g., the outputs of the acoustic model), the start state based rejection model and the key phrase model associated with a predetermined key phrase may be updated. For example, the start state based rejection model and the key phrase model may be updated at each time instance of an output from the acoustic model. The start state based rejection model may include, for example, a single state having self loops associated with some of the scores of sub-phonetic units of the acoustic model. Such self loops may include updates to the single state based on outputs from the acoustic model without any transitions from other states of the model. Furthermore, the key phrase model may include a multi-state lexicon look up key phrase model having transitions between the states that are associated with the lexicon look up for the predetermined key phrase.

As discussed, based on the updates to the start state based rejection model and the key phrase model, optionally including a backward transition from an intermediate state of the key phrase model to the start state based rejection model, a determination may be made as to whether the received input speech is associated with the predetermined key phrase. In an embodiment, the single state of the start state based rejection model may provide a rejection likelihood score (e.g., a likelihood the received speech is not the key phrase) and the final state of the key phrase model provide a key phrase likelihood score (e.g., a likelihood the received speech is the key phrase) for the received audio input. In an embodiment, the single state of the start state based rejection model may provide a rejection likelihood score and a minimum or the like of two or more scoring states of the key phrase model may provide an overall key phrase likelihood score or a final key phrase likelihood score or the like. The determination as to whether the received audio input is associated with the predetermined key phrase may be determined based on the rejection likelihood score and the key phrase likelihood score or the overall key phrase likelihood score. For example, a likelihood score (e.g., a log likelihood ratio) based on the rejection likelihood score and the key phrase likelihood score or the overall key phrase likelihood score may be determined and compared to a predetermined threshold. For example, if the log likelihood score is greater than the threshold, the device may be activated or woken from a sleep mode, a system command may be provided, or the like.

FIG. 1 is an illustrative diagram of an example setting 100 for providing key phrase detection, arranged in accordance with at least some implementations of the present disclosure. As shown in FIG. 1, setting 100 may include a user 101 providing audio input 111 to a device 102. For example, device 102 may be in a deep sleep or power saving mode or the like and user 101 may be attempting to wake device 102 via key phrase detection. If user 101 provides audio input 111 that is identified as the key phrase of device 102, device 102 may wake from a sleep or power saving mode or the like. For example, device 102 may provide an automatic wake on voice capability for user 101. As shown, in some examples, an automatic wake on voice system may be implemented via device 102 such that device 102 may be a smartphone. However, device 102 may be any suitable device such as a computer, a laptop, an ultrabook, a smartphone, a tablet, a phablet, a wearable device such as a smart watch or eye glasses, or the like. In any case, device 102 may be described as a computing device as used herein.

As shown, in some examples, user 101 may provide audio input 111 in an attempt to wake device 102 or the like. As will be appreciated, device 102 may also receive as audio input background noise, silence, background speech, speech not intended to attain access to device 102, and the like. For example, device 102 may need to differentiate or classify audio (e.g., audio input 111 or other audio) that does not match a predetermined key phrase (e.g., as provided by a rejection model as discussed herein) from audio that matches the predetermined key phrase (e.g., as provided by a key phrase model as discussed herein).

Figure 2:
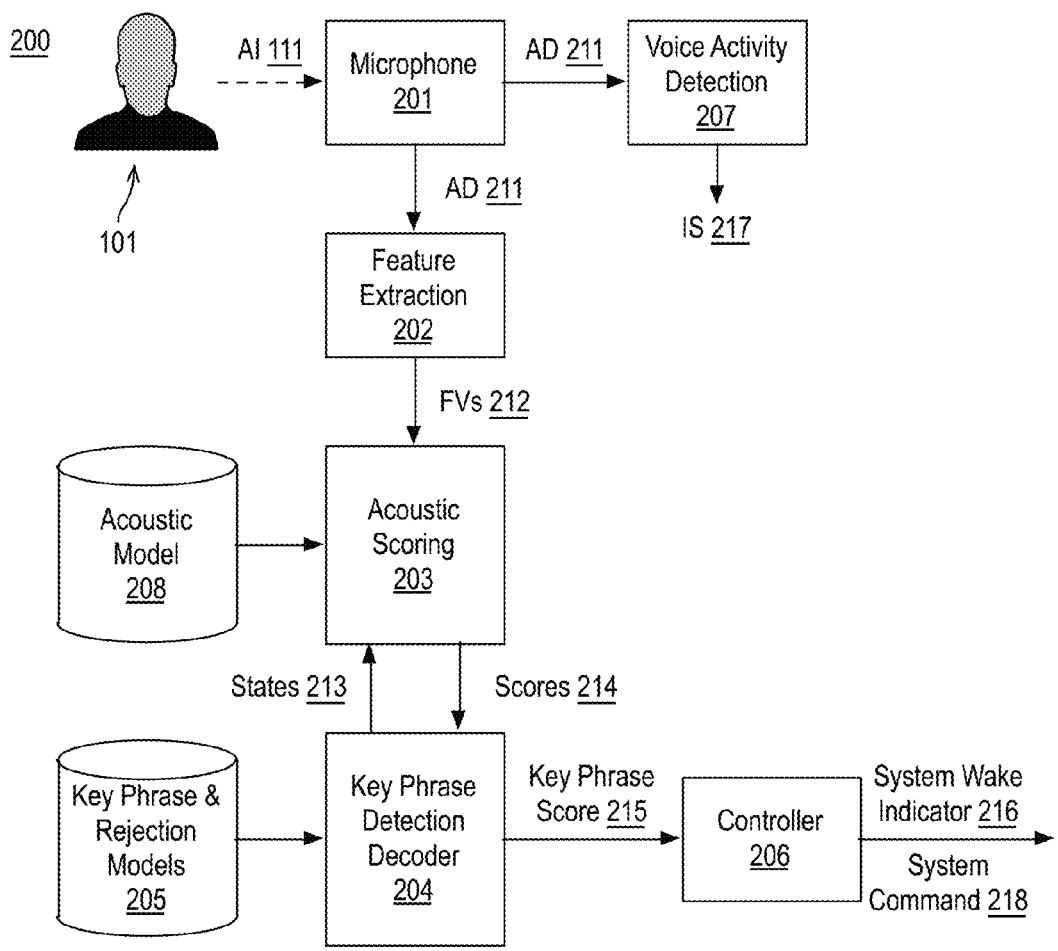
FIG. 2 is an illustrative diagram of an example system for providing key phrase detection.

FIG. 2 is an illustrative diagram of an example system 200 for providing key phrase detection, arranged in accordance with at least some implementations of the present disclosure. As shown in FIG. 2, system 200 may include a microphone 201, a feature extraction module 202, an acoustic scoring module 203, a key phrase detection decoder 204, key phrase and rejection models 205, a controller 206, an acoustic model 208, and a voice activity detection module 207. For example, as shown in FIG. 2, key phrase detection decoder 204 may provide a key phrase score 215 to controller 206. Based on key phrase score 215 (e.g., if key phrase score 215 is greater than a threshold or the like), controller 206 may provide a system wake indicator 216 (e.g., if key phrase score 215 indicates a predetermined key phrase has been matched) or controller 206 may not provide such an indicator and system 200 may continue evaluating input speech for a match. As shown, in some examples, controller 206 may also provide a system command 218 associated with the key phrase to request system 200 to perform an operation such as starting an application, generating or retrieving data, or the like. As is discussed further herein, in some embodiments, feature extraction module 202, acoustic scoring module 203, key phrase detection decoder 204, controller 206, and voice activity detection module 207 may be implemented via a digital signal processor (DSP).

As discussed, in some embodiments, system 200 may implement a single key phrase such that, upon detection of the key phrase, system wake indicator 216 and/or system command 218 may be provided. In other embodiments, system 200 may implement multiple key phrases (based on implementing multiple key phrase models as discussed herein). In such embodiments, if any of the key phrases are detected, system wake indicator 216 and/or system command 218 may be provided. Furthermore, system command 218 may be associated with a particular key phrase of the key phrases. For example, a first wake up command (e.g., key phrase) such as "Computer, Play Music" may wake the device (e.g., via system wake indicator 216) and play music (e.g., via a music play command implemented by system command 218) and a second wake up command (e.g., key phrase) such as "Computer, Do I Have Mail? may wake the device (e.g., via system wake indicator 216) and determine whether mail has been received (e.g., via a get mail command implemented by system command 218).

As shown, microphone 201 may receive audio input (AI) 111 from user 101 (or multiple users or an environment or the like). In some examples, audio input 111 is issued by user 101 to wake system 200 and/or to have system 200 perform an operation. As discussed, microphone 201 may receive audio input that is not intended to wake system 200 or other background noise or even silence. For example, audio input 111 may include any speech issued by user 101 and any other background noise or silence or the like in the environment of microphone 201. Audio input 111 may be characterized as audio, input audio, an input speech stream, or the like. Microphone 201 may receive audio input 111 and/or other audio (e.g., as sound waves in the air) and convert audio input 111 and/or such other audio to an electrical signal such as a digital signal to generate audio data (AD) 211. For example, audio data 211 may be stored in memory (not shown in FIG. 2), transferred for continued processing, or the like.

As shown, voice activity detection module 207 may receive audio data 211. For example, voice activity detection module 207 may operate (e.g., via a DSP) even in a deep sleep mode of system 200 to continuously monitor audio data 211. Upon detection of a voice or other sound that requires further evaluation by system 200, voice activity detection module 207 may provide initiation signal (IS) 217, which may activate the other modules of system 200 to provide key phrase detection. For example, voice activity detection module 207 may provide initiation signal 217 to feature extraction module 202 to activate feature extraction module 202 and other components of system 200. In an embodiment, a portion of audio data 211 (e.g., 360 ms of audio data or the like) may be buffered by a ring-buffer or the like. When a voice or other sound that requires further evaluation is detected by voice activity detection module 207, feature extraction module 202 may receive the data from the buffer and further incoming audio via audio data 211.

If a predetermined key phrase is detected, as discussed herein, system 200 may enter a higher level mode of operation for user 101. Furthermore, voice activity detection module 207 may operate during key phrase detection (e.g., while a key phrase is not detected or not yet detected) to determine whether system 200 may be put back into a deep sleep mode or the like. For example, voice activity detection module 207 may provide a low power always listening capability for system 200. For example, upon activation by initiation signal 217, audio data 211 may be continuously monitored for key phrase detection until controller 206 determines a key phrase has been detected and system wake indicator 216 is provided or until a determination is made by voice activity detection module 207 to reenter a sleep mode or low power state or the like.

As discussed, feature extraction module 202 may receive audio data 211. For example, feature extraction module 202 may receive audio data 211 from microphone 201, from the discussed buffer, from other memory of system 200, or the like and feature extraction module 202 may generate feature vectors 212 associated with audio input 111. Feature vectors 212 may be any suitable features or feature vectors or the like representing audio input 111. For example, feature vectors 212 may be a time series of feature vectors (e.g., feature vectors each generated for an instance of time) such that each of feature vectors 212 includes a stack of features or feature vectors each from an instance of time such as a sampling time or the like.

Figure 3:
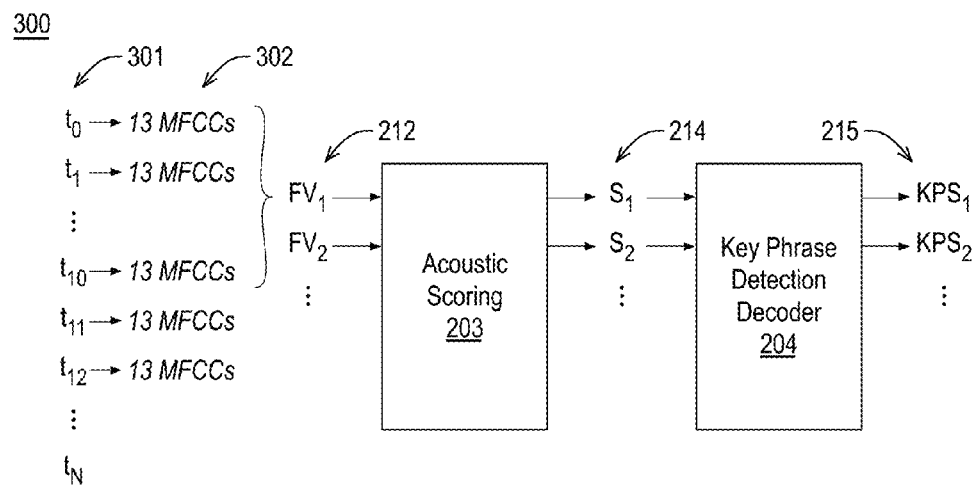
FIG. 3 illustrates example data structures associated with key phrase detection.

FIG. 3 illustrates example data structures 300 associated with key phrase detection, arranged in accordance with at least some implementations of the present disclosure. As shown in FIG. 3, at each of multiple sampling times 301 (e.g., represented as sampling times $t_0, t_1, \ldots, t_N$), sampling coefficients 302 such as Mel frequency cepstrum coefficients (MFCCs) or the like may be generated. Sampling times 301 may be at any suitable interval such as every 10 ms or the like and the sampling performed at each sampling time of sampling times 301 may sample any duration of input speech or audio such as 25 ms of audio or the like. Sampling coefficients 302 may include any number of sampling coefficients such as 13 coefficients as in the illustrated example. Furthermore, sampling coefficients 302 may each be referred to as features, a feature vector, a sampling, or the like. For example, sampling coefficients 302 may be coefficients representing a power spectrum of the received audio. As discussed, in an embodiment, sampling coefficients 302 are Mel frequency cepstrum coefficients representing a power spectrum of the received audio. For example, with reference to FIG. 2, Mel frequency cepstrum coefficients may be determined based on audio input 111 (e.g., via audio data 211) by taking a Fourier transform of audio input 111 and/or audio received via microphone 201, mapping to the Mel scale, determining logs of the powers at each Mel frequency, and determining the Mel frequency cepstrum coefficients based on a discrete cosine transform (DCT) of the logs of the powers.

With continued reference to FIG. 3, sampling coefficients 302 may be stacked or concatenated or combined or the like to generate feature vectors 212. As shown, in an embodiment, 11 instances of sampling coefficients 302 may be combined to generate each feature vector of feature vectors 212. Furthermore, prior to stacking, sampling coefficients 302 may be normalized or the like. For example, Mel frequency cepstrum coefficients may be processed by cepstral mean normalization or the like to generate sampling coefficients 302. As shown, in an embodiment, 11 instances of sampling coefficients 302 may be combined to generate each feature vector such that each feature vector is a 143 (e.g., 11×13) dimensional vector. However, any number of instances of sampling coefficients 302 may be combined or stacked to generate feature vectors 212. As shown, feature vector $FV_1$ may include sampling coefficients associated with times $t_0$-$t_{10}$. Furthermore, feature vector $FV_2$ may include sampling coefficients associated with times $t_1$-$t_{11}$, feature vector $FV_3$ may include sampling coefficients associated with times $t_2$-$t_{12}$, and so on such that adjacent feature vectors have overlap with respect to sampling coefficients 302 that are included therein.

As shown in FIGS. 2 and 3, feature vectors 212 may be provided to acoustic scoring module 203. Acoustic scoring module 203 may score feature vectors 212 based on acoustic model 208 as received via memory and provide any number of output scores 214 based on feature vectors 212. Output scores 214 may be characterized as scores, probabilities, scores of sub-phonetic units, or the like. For example, acoustic scoring module 203 may generate such output scores or states for each of feature vectors 212 to generate a time series of scores 214 (e.g., represented as scores $S_1$, $S_2$, . . . in FIG. 3). For example, scores 214 may be a time series of scores of sub-phonetic units. In an embodiment, acoustic scoring module 203 receives and implements acoustic model 208 as discussed herein. In an embodiment, acoustic model 208 may be a deep neural network (DNN) pretrained based on a training set of audio. In an embodiment, acoustic model 208 may be a deep neural network having any number of outputs such as 4,000 outputs or the like. In another embodiment, acoustic model 208 is a pruned deep neural network having the number of outputs reduced or pruned such that only a subset of available outputs (e.g., as determined set-up and/or training) are provided or activated. Such pruning may provide a smaller memory footprint and/or lower computational requirements during implementation. Such required outputs may be provided by states signal 213 or such required outputs may be preset or pretrained prior to implementation.

For example, the outputs of acoustic scoring module 203 (e.g., scores 214) may represent sub-phonetic units such as tied context-dependent triphone states. Such tied context-dependent triphone states may represent monophones tied to monophones on either side (e.g., left and right) to generate tied context-dependent triphones. A language, for example, may have a number of monophones (e.g., 30-50 monophones) and sub-phonetic units such as exemplary tied context-dependent triphone states may include each of such monophones in a variety of contexts such that various other monophones are before and after such monophones to generate many combinations (e.g., the sub-phonetic units). Acoustic scoring module 203 may, based on feature vectors 212, provide probabilities or scores or the like associated with such sub-phonetic units (e.g., probabilities or scores as to which unit or phone has been spoken) as well as probabilities or scores associated with silence and/or background noise or the like at its outputs. As shown in FIG. 3 and as discussed further herein, for each or some of scores 214, key phrase detection decoder 204 may generate a corresponding key phrase score 215 (e.g., represented as key phrase scores $KPS_1$, $KPS_2$, . . . ). In the example of FIG. 3, a key phrase score 215 is generated at each time instance as associated with scores 214. In other examples, a key phrase score 215 may be generated at less frequent time intervals.

Furthermore, as discussed, in some embodiments, a single key phrase may be detected and a system may be woken (e.g., via system wake indicator 216) and an optional command may be issued (e.g., via system command 218) based on the detected key phrase. In other embodiments, a second or additional key phrases may be implemented and associated key phrase models may be evaluated by key phrase detection decoder 204. For example, such key phrase models may be evaluated and associated key phrase scores may be evaluate to determine whether a particular key phrase of multiple key phrases has been detected. For example, as discussed further herein, multiple key phrase models may be provided. In the context of FIG. 3, key phrase detection decoder 204 may generate a key phrase score or scores for each of such key phrase models (and at multiple time instances) for evaluation by controller 206.

Figure 4:
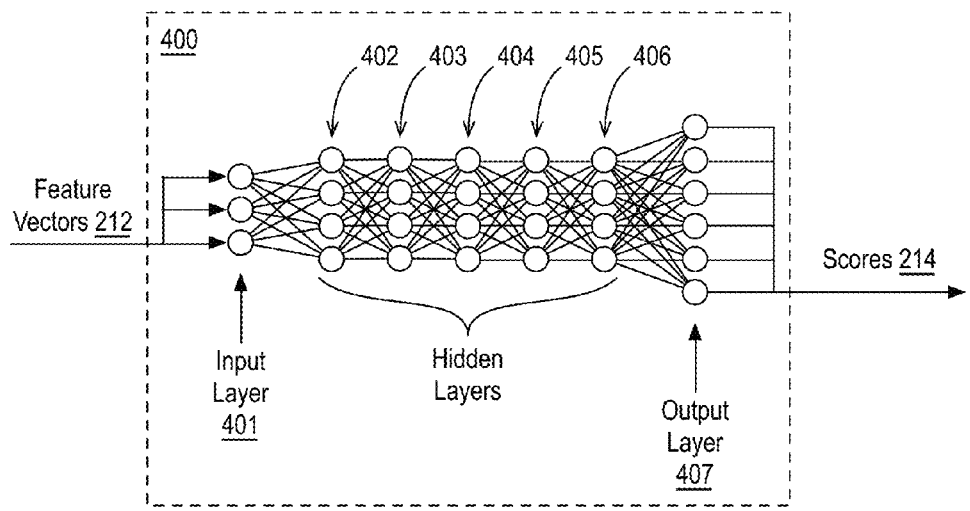
FIG. 4 illustrates an example acoustic model deep neural network.

FIG. 4 illustrates an example acoustic model neural network 400, arranged in accordance with at least some implementations of the present disclosure. For example, neural network 400 may be implemented as acoustic scoring module 203 in some embodiments. Neural network 400 may include any suitable neural network such as an artificial neural network, a deep neural network, a convolutional neural network, or the like. As shown in FIG. 4, neural network 400 may include an input layer 401, hidden layers 402-406, and an output layer 407. Neural network 400 is illustrated as having three input nodes, hidden layers with four nodes each, and six output nodes for the sake of clarity of presentation, however, neural network 400 may include any such input, hidden, and output nodes. Input layer 401 may include any suitable number of nodes such as a number of nodes equal to the number of elements in each of feature vectors 212. For example, input layer 401 may have 143 nodes corresponding to each of the 143 dimensions of feature vectors 212. In other examples, feature vectors may have fewer or more elements or dimensions and input layer 401 may have a corresponding number of nodes.

Furthermore, as in the illustrated example, neural network 400 may include five hidden layers 402-406. However, neural network 400 may include any number of hidden layers. Hidden layers 402-406 may include any number of nodes. For example, hidden layers 402-406 may include 1,500 to 2,000 nodes, 2,000 to 2,500 nodes, or the like. In some examples, hidden layers 402-406 have the same number of nodes and, in other examples, one or more layers may have different numbers of nodes. Output layer 407 may include any suitable number of nodes such that scores 214 include values corresponding to tied context-dependent triphone states or the like. In some examples, neural network 400 may implement Hidden Markov Models (HMMs). As discussed, in some embodiments, output layer 407 may be pruned such that only predetermined output nodes (and associated scores 214) are provided such that a subset of available states or scores are implemented via neural network 400.

Returning to FIG. 2, as discussed, scores 214 from acoustic scoring module 203 may be provided to key phrase detection decoder 204. Also, as shown, key phrase detection decoder 204 may also receive and implement a key phrase model (or multiple key phrase models) and a rejection model. For example, key phrase detection decoder 204 may receive a key phrase model (or multiple key phrase models) and a rejection model (e.g., key phrase and rejection models 205) from memory. For example, key phrase detection decoder 204 may receive and implement the rejection and key phrase models as discussed with respect to FIG. 5 or 7 herein or the like.

Figure 5:
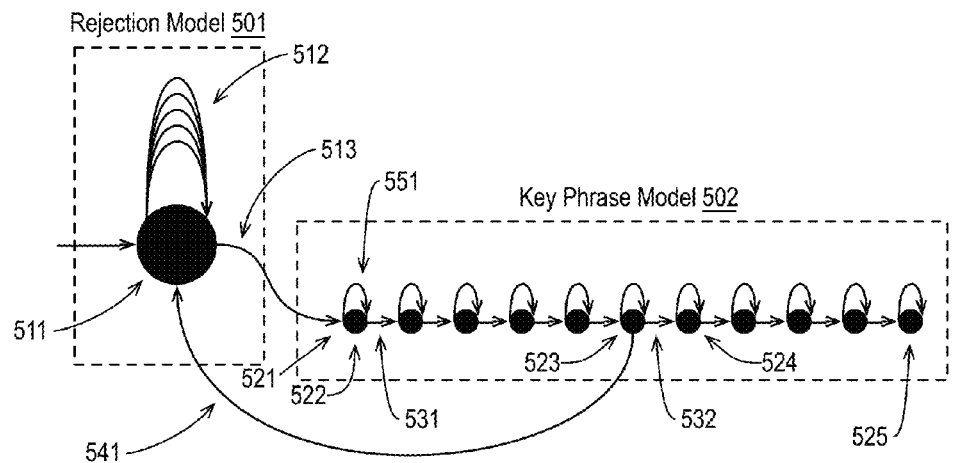
FIG. 5 illustrates an example rejection model and an example key phrase model including a backward transition.

FIG. 5 illustrates an example rejection model 501 and an example key phrase model 502 including a backward transition 541, arranged in accordance with at least some implementations of the present disclosure. For example, rejection model 501 and key phrase model 502 may be provided via key phrase and rejection models 205 for implementation via key phrase detection decoder 204. As shown in FIG. 5, rejection model 501 may include a rejection state 511 and multiple self loops 512. For example, rejection state 511 may correspond to a start state or a single state and may provide a single start state based rejection model. Furthermore, each of self loops 512 may be associated with one of scores 214 (e.g., an output from acoustic scoring module 203) such that self loops 512 provide self updates or summing or the like for rejection state 511 of rejection model 501. For example, each of self loops 512 may be associated with a deep neural network output or output node that corresponds to a sub-phonetic unit. Using such techniques, for example, rejection state 511 may provide a start state that implements a rejection model. Self loops 512 may include any number of self loops. In some embodiments, acoustic scoring module 203 may not be pruned and, in such embodiments, self loops 512 may include thousands of self loops. In other embodiments, acoustic scoring module 203 may be pruned and, in such embodiments, self loops 512 may include tens of self loops associated with likely rejection states. For example, at each time instance of outputs from acoustic scoring module 203, rejection model 501 may be updated to provide a rejection likelihood score associated therewith. For example, self loops 512 may illustrate updates to rejection state 511 at each time instance of outputs (e.g., scores 214) from acoustic scoring module 203. In an embodiment, at each time instance, rejection state 511 may be updated with a highest likelihood score among self loops 512.

Also as shown in FIG. 5, key phrase model 502 may be subsequent to rejection model 501 and connected by transition 513. Key phrase model 502 may include multiple states 521 such as state 522, state 523, state 524, state 525 and other states as shown interconnected by transitions 531 such as transition 532 and other transitions as shown. In FIG. 5, each state and each transition are not labeled for the sake of clarity of presentation. Furthermore, key phrase model 502 may include a backward transition 541 (or transitions) that transitions from state 523 to rejection state 511 of rejection model 501, as is discussed further herein. Each of states 521 may include or be updated by one or more self loops such as self loop 551 and each of states 521 may be updated based on a transition of transitions 531 or transition 513 from a prior state in key phrase model 502. For example, each self loop 551 (or arc) may be associated with or correspond to an output (e.g., a score of scores 214) from acoustic scoring module 203. In the illustrated example, each of states 521 has a single self loop 551. However, one or more of states 521 may include multiple self loops. In some examples, one or more of states 521 may be silence states having self loops representative of silence such that key phrases may be modeled that include silence. Key phrase model 502 may include any suitable model. For example, key phrase model 502 may be selected based on the predetermined key phrase implemented via system 200 and key phrase model 502 may be selected based on a lexicon look up. For example, transitions 531 between states 521 may be selected based on the triphone-HMM-state sequence in the lexicon.

Based on rejection model 501 and key phrase model 502, at each or some time instances, a rejection likelihood score and a key phrase likelihood score may be determined. For example, the rejection likelihood score may be a score associated with rejection state 511 of rejection model 501 and the key phrase likelihood score may be associated with final state 525 of states 521 of key phrase model 502. For example, rejection model 501 and key phrase model 502 may be initialized with all nodes or states thereof at null or negative infinity or the like. With reference to FIGS. 2 and 5, based on a first feature vector $FV_1$, acoustic scoring module 203 may generate scores $S_1$, and rejection state 511 of rejection model 501 and a first state (e.g., state 522) of key phrase model 502 may be updated. Upon a second feature vector $FV_2$ being processed, acoustic scoring module 203 may generate scores $S_2$, and rejection state 511 of rejection model 501 and a first and second state of key phrase model 502 may be updated. Such processing may continue until final state 525 is updated from its initialization state to a meaningful scoring. At such a time instance (and subsequent time instances as updates continue), the score or probability or the like of rejection state 511 and the score or probability or the like of final state 525 may be used to determine whether the predetermined key phrase has been detected. For example, a time series of key phrase scores 215 may be generated by key phrase detection decoder 204 based on scores 214, rejection model 501, and key phrase model 502.

For example, at a current time instance, the scoring of single state 512 or any of states 521 may proceed as follows. For the state, a highest probability score or maximum score or the like of the self loops corresponding with the state may be determined for the current time instance (e.g., t+1). The highest probability score for the current time instance for the state may then be added to the maximum of the score for the state at the previous time instance (e.g., t) and any score transitioned to the state. For example, the score or scores transitioned to a state may correspond to the previous time instance (e.g., t) and may be the score of the state transitioning to the state being updated. For example, with reference to state 522, the score of state 522 at a current time instance (e.g., t+1) may be the value (e.g., score) of the self loop of state 522 or a maximum value of self loops of state 522 (if more than one self loop is provided) at the current time instance (e.g., as provided by acoustic scoring module 203) added to the maximum of the score of state 522 at a previous time instance (e.g., t) and the score transitioned to state 522 by single state 512 (e.g., the score of single state 512 at time t).

Similarly, the score of rejection state 511 at a current time instance (e.g., t+1) may be the maximum value of self loops 512 at the current time instance (e.g., as provided by acoustic scoring module 203) added to the maximum of the score of rejection state 511 at a previous time instance (e.g., t) and the score transitioned to single state 512 by state 523 (e.g., the score of single state 523 at time t) via transition 541. In an embodiment, transition 541 may provide a transition of the score of state 523 to rejection state 511 such that a maximum of self loops may be added to it if the score is greater than the previous score at rejection state 511. In another embodiment, transition 541 may provide multiple transitions each including the score of state 523 and one of self loops 512. Furthermore, the score of state 524 at a current time instance may be the value of the self loop of state 524 or a maximum value of the self loops of state 524 (if more than one self loop is provided) at the current time instance (e.g., as provided by acoustic scoring module 203) added to the maximum of the score of state 524 at a previous time instance (e.g., t) and the score transitioned to state 524 by state 523 (e.g., the score of single state 512 at time t). As discussed, scoring of each of states 521 may be provided in a similar manner at each time instance.

Such scoring of rejection model 501 and key phrase model 502 may be performed at each available time instance. Furthermore, the discussed key phrase likelihood scoring and rejection likelihood scoring may be performed at each available time instance until a key phrase is detected.

As discussed, key phrase model 502 may include backward transition 541. Backward transition 541 may provide for a reduction or elimination of the difference between the score at rejection state 511 (e.g., via backward transition 541) and the score at state 524 (e.g., via transition 532). Backward transition 541 may be characterized as a rejection loopback, a rejection transition, a loopback to a rejection model, or the like. For example, transition 513, transitions 531, and transition 541 may provide a transition of the score of the sending state to the receiving state such that the score of the receiving state may be updated to the received score if the received score is greater than the current score of the receiving state. In the context of key phrase model 502, a relatively high score at state 523 may be provided to state 524 via transition 532 and/or to rejection state 511 of rejection model 501 via transition 541. In such contexts, upon updating the score at rejection state 511 of rejection model 501 and the score at state 524, the updates may performed (as discussed) based on the maximum of the transitioned score from state 523 and the previous score of rejection state 511 (e.g., at rejection state 511) and the maximum of the transitioned score from state 523 and the previous score of single state 524 (e.g., at state 524). When both state 524 and rejection state 511 use the transitioned score, the difference between the scores of the states may be reduced or eliminated. For example, as discussed, in such contexts, the current score at state 524 may be the transitioned score (e.g., as it was the maximum score in the discussed example) plus the self loop or maximum of self loops at state 524 and the and the current score at rejection state 511 may be the transitioned score (e.g., as it was the maximum score in the discussed example) plus the maximum of self loops 512 at rejection state 511. As subsequent updating or scoring of rejection model 501 and key phrase model 502 continue, any increase in the score at state 525 (e.g., a final state of key phrase model 502) over the score at rejection state 511 of rejection model 501 may need to be attained starting from state 524 onward (e.g., as the difference between rejection state 511 and state 524 was minimized or reduced).

Such techniques may provide for the requirement that the first part of a key phrase is uttered and for the requirement that the second part of the key phrase is also uttered. Without backward transition 541, in some examples, key phrase model 502 may provide a high probability or score for utterances where the first part matches the key phrase. When the second part of the utterance is incorrect, the scoring of rejection state 511 of rejection model 501 may not recover with respect to the continued scoring of states 521 of key phrase model 502 up to scoring state 525. For example, rejection model 501 may not score high enough or recover and the uttered phrase may be falsely accepted. Such problems may be prevalent when the key phrase has parts of equal length (e.g., "Hello Dragon") or where the first part of the key phrase is longer than the second part (e.g., "Good-morning Dragon" such that good-morning may be hyphenated as it is spoken without pause and may be regarded as one word for detection purposes). The provision of backward transition may eliminate or reduce such false accepts.

In the example of FIG. 5, key phrase model 502 includes backward transition 541 (or multiple backward transitions as discussed) to rejection state 511 of rejection model 501. Key phrase model 502 may include any number of additional backward transitions to rejection state 511 of rejection model 501 from any of states 521 of key phrase model 502. In an embodiment, key phrase model 502 includes a backward transition for each syllable of the key phrase corresponding to key phrase model 502. In an embodiment, a backward transition 541 to rejection state 511 of rejection model 501 may be provided such that backward transition 541 is after (e.g., immediately after) the first word of the key phrase corresponding to key phrase model 502. Such an embodiment may be advantageous when the key phrase has two words. In an embodiment, key phrase model 502 may includes a backward transition after each word of the key phrase corresponding to key phrase model 502 except for the last word of the key phrase. In some embodiments, backward transition(s) may be provided after (e.g., immediately after) a phonetic part, syllable, or particular number of syllables of the key phrase corresponding to key phrase model 502. Such backward transitions may be provided using any suitable technique or techniques. In an embodiment, backward transitions may be provided using scores of sub-phonetic units associated with silence or using all scores of sub-phonetic units associated with rejection model 501 or the like. Furthermore, in some examples, self loops 512 may be associated with scores 214 such that none of such scores are associated with any of self loop 551 of states 521. For example, key phrase model 502 may be constructed including selection of self loops 551 and associated scores of scores 214 and, during construction of rejection model 502, such scores of scores 214 may be excluded from use in rejection model 502.

With reference to FIG. 2, key phrase scores 215 may include any suitable key phrase score that compares the likelihood generated at rejection state 511 with the likelihood generated at any state of key phrase model 502 such as final state 525. For example, key phrase scores 215 may be difference between such states, a ratio of such states, or the states themselves. In an embodiment, a key phrase score of key phrase scores 215 may be a log likelihood ratio. For example, a key phrase score of key phrase scores 215 may be determined as shown in Equation (1):

$$KPS = \log(p(X|\text{KeyPhrase})) - \log(p(X|\text{Reject})) \quad (1)$$

where KPS may be the key phrase score, X may be the current accumulation of feature vectors being evaluated, and p provides a probability X is a member of KeyPhrase or Reject.

Returning to FIG. 2, as shown, controller 206 may receive key phrase score 215 (e.g., a time series of key phrase scores) and controller 206 may compare key phrase score 215 to a threshold or the like to determine whether the predetermined key phrase has been detected. For example, if key phrase score 215 is greater than (or greater than or equal to) the threshold, the predetermined key phrase has been detected and controller 206 may provide system wake indicator 216 to wake system 200. If key phrase score 215 is less than (or less than or equal to) the threshold, the predetermined key phrase has not been detected and controller 206 may not provide system wake indicator 216 and controller may continue to monitor key phrase score 215.

As discussed herein and as shown in FIG. 5, in some embodiments, a single key phrase model 502 may be implemented (e.g., for a single key phrase). In other embodiments, multiple key phrase models (e.g., each associated with a different key phrase) may be implemented. For example, each of the multiple key phrase models may be subsequent to rejection model 501 and connected to rejection model 501 by a transition in analogy to key phrase model 502 being connected to rejection model 501 by transition 513. Furthermore, as discussed with respect to key phrase model 502, each of the multiple key phrase models may include multiple states interconnected by transitions and each of the states may include or be updated by one or more self loop such that the states may be updated based on a transition from a prior state in the key phrase model (or the transition from rejection model 501). As discussed, each self loop may be associated with an output (e.g., a score) from acoustic scoring module 203. Furthermore, each key phrase model may include one or more backward transitions to rejection model 501 in analogy to backward transition 541.

Based on rejection model 501 and each of the multiple key phrase models, at each or some time instances, a rejection likelihood score and a key phrase likelihood score for each key phrase model may be determined. For example, the rejection likelihood score may be a score associated with rejection state 511 of rejection model 501 and the key phrase likelihood score may be associated with a final state of the states of each of the multiple key phrase models. Based on the rejection likelihood score and the key phrase likelihood score of each of the multiple key phrase models, a key phrase score for each of the multiple key phrase models may be generated as discussed herein.

For example, returning to FIG. 2, controller 206 may receive such key phrase scores (e.g., a time series of key phrase scores) and controller 206 may compare such key phrase scores to a threshold or respective thresholds to determine whether any of the predetermined key phrases have been detected. For example, if any of the key phrase scores is greater than (or greater than or equal to) the threshold or its respective threshold, a particular predetermined key phrase has been detected and controller 206 may provide system wake indicator 216 to wake system 200 and an optional command indicator (e.g., system command 218) to perform a command associated with the particular predetermined key phrase. If all of the key phrase scores are less than (or less than or equal to) the threshold or their respective thresholds, controller 206 may not provide system wake indicator 216 and controller may continue monitoring for a predetermined key phrase.

Figure 6:
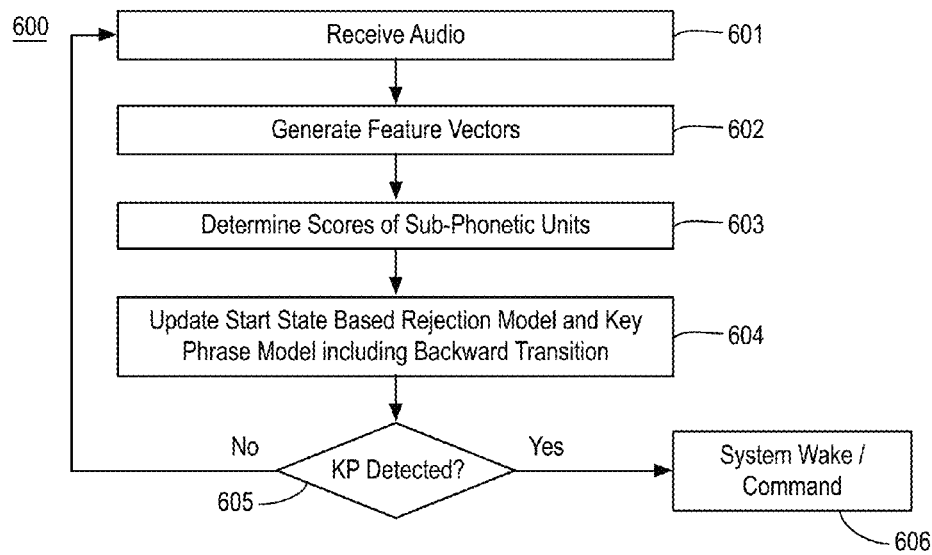
FIG. 6 illustrates an example process for providing key phrase detection including a backward transition from a key phrase model to a rejection model.

FIG. 6 illustrates an example process 600 for providing key phrase detection including a backward transition from a key phrase model to a rejection model, arranged in accordance with at least some implementations of the present disclosure. Process 600 may include one or more operations 601-606 as illustrated in FIG. 6. Process 600 or portions thereof may be performed by a device or system (e.g., system 200 or any other device or system discussed herein) to detect a key phrase. Process 600 or portions thereof may be repeated for any amount of received audio, for any number of sleep to wake transitions, or the like.

Process 600 may begin at operation 601, where audio input may be received. Audio input may be received using any suitable technique or techniques. In an embodiment, audio input 111 may be received via microphone 201 of system 200 as discussed herein. Processing may continue at operation 602, where feature vectors may be generated using any suitable technique or techniques. In an embodiment, feature vectors 212 may be generated via feature extraction module 202 of system 200 based on audio data 211 as discussed herein. Processing may continue at operation 603, where scores of sub-phonetic units may be determined using any suitable technique or techniques. For example, acoustic scoring module 203 may implement acoustic model 208 such as a deep neural network or the like to determine scores 214 based on feature vectors 212.

Processing may continue at operation 604, where a start state based rejection model and a key phrase model may be updated based on the scores of sub-phonetic units. For example, a single state of the rejection model may be updated at each time instance of scores of sub-phonetic units or at regular intervals of scores of sub-phonetic units or the like. Similarly, multiple states of the key phrase model may each be updated at each time instance of scores of sub-phonetic units or at regular intervals of scores of sub-phonetic units or the like. As discussed, the single state of the rejection model may be updated based on the highest probability score associated with one of multiple self loops of the single state and a maximum of the previous score at the single state of the rejection model and a backward transition and each state of the key phrase model may be updated based on a self loop (or a maximum of multiple self loops) associated with the state and a maximum of the previous score at the state and a transition from a previous state in the key phrase model. In an embodiment, key phrase detection decoder 204 of system 200 may implement rejection model 501 and key phrase model 502 including one or more backward transitions as discussed herein.

Processing may continue at decision operation 605, where a determination may be made as to whether a key phrase (KP) has been detected. Such a determination may be made using any suitable technique or techniques. In an embodiment, the determination may be based on a rejection likelihood score from the rejection model updated at operation 604 and a key phrase likelihood score from the key phrase model updated at operation 604. In an embodiment, a log likelihood score may be determined based on the rejection likelihood score and the key phrase likelihood score (e.g., as discussed with respect to Equation (1)) and the log likelihood score may be compared to a predetermined threshold. For example, if the log likelihood score exceeds (or meets) the threshold, decision operation 605 may determine the key phrase has been detected. In an embodiment, controller 206 as implemented by system 200 may determine whether a key phrase has been detected using such techniques.

If a key phrase has been detected, processing may continue at operation 606, where a system wake and/or a system command may be provided based on the detected key phrase. The system wake and/or system command may include any suitable command(s) and may be implemented using any suitable technique or techniques. In an embodiment, controller 206 of system 200 may issue system wake indicator and/or system command 218 in response to the key phrase being detected.

If a key phrase has not been detected, processing may continue at operation 601, where additional audio may be received and processing may continue as discussed. For example, process 600 may continue until a predetermined key phrase is detected. Although process 600 is illustrated as a discrete operations for clarity of presentation, at least portions of processing may be performed in parallel in some examples.

Furthermore, in some examples, process 600 may be initiated in response to an initiation signal such as initiation signal 217, which may indicate an audio input worthy of evaluation has been received. Furthermore, in some examples, process 600 may accommodate multiple key phrase models all or some of which may include backward transitions. For example, operation 603 may generate all scores needed by such multiple key phrase models, operation 604 may update all such multiple key phrase models, and decision operation 605 may evaluate key phrase likelihood and rejection likelihood scores from all such multiple key phrase models to determine whether any such key phrases are detected. If so, operation 606 may provide a wake command and/or a specific command associated with the key phrase detected.

With reference to FIG. 2, as discussed, key phrase detection decoder 204 may receive and implement rejection model 501 and key phrase model 502 providing a backward transition or transitions. In addition or in the alternative, key phrase detection decoder 204 may receive and implement a rejection model and a key phrase model providing intermediate scoring.

Figure 7:
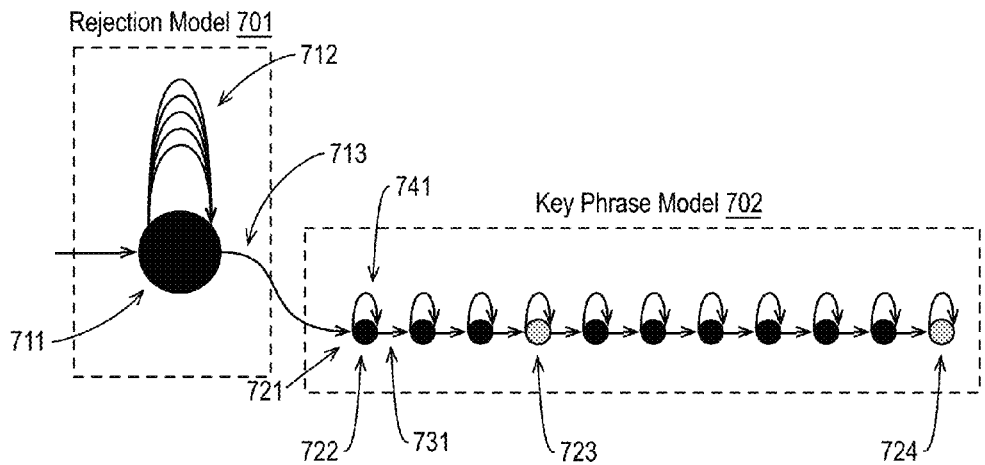
FIG. 7 illustrates an example rejection model and an example key phrase model including intermediate scoring.

FIG. 7 illustrates an example rejection model 701 and an example key phrase model 702 including intermediate scoring, arranged in accordance with at least some implementations of the present disclosure. For example, rejection model 701 and key phrase model 702 may be provided via key phrase and rejection models 205 for implementation via key phrase detection decoder 204. As shown in FIG. 7, rejection model 701 may include a rejection state 711 and multiple self loops 712. For example, rejection state 711 may correspond to a start state or a single state and may provide a single start state based rejection model and each of self loops 712 may be associated with one of scores 214 such that self loops 712 provide self updates or summing or the like for rejection state 711 of rejection model 701. As discussed with respect to FIG. 5, each of self loops 712 may be associated with a deep neural network output or output node that corresponds to a sub-phonetic unit and rejection state 711 may provide a start state that implements a rejection model. Rejection state 711 and self loops 712 may include any characteristics as discussed with respect to FIG. 5, which will not be repeated for the sake of brevity.

Also as shown, key phrase model 702 may be subsequent to rejection model 701 and connected by transition 713. Key phrase model 702 may include multiple states 721 such as first state 722, intermediate scoring state 723, final scoring state 724, and other states as shown interconnected by transitions 731. In FIG. 7, each state and each transition are not labeled for the sake of clarity of presentation. As shown, key phrase model 702 may include multiple scoring states such as intermediate scoring state 723 and final scoring state 724. Key phrase model 702 may include any number of scoring states such as two or more. As is discussed further herein below, scoring states may be those states of key phrase model 702 used for scoring a likelihood a key phrase has been uttered. For example, scoring states may be those states where scoring is occurring and such states may be characterized as scoring states, evaluation states, target states, or the like. Such scoring states may be placed in any suitable location within key phrase model 702. In an embodiment, scoring states may correspond to endpoints of words, phonetic parts, or syllables. In the example of key phrase model 702, intermediate scoring state 723 may correspond to an endpoint of a first word of a key phrase corresponding to key phrase model 702 and final scoring state 724 may correspond to a second and final word of the key phrase.

As discussed with respect to FIG. 5, each of states 721 may include or be updated by one or more self loops 741 and each of states 721 may be updated based on a transition of transitions 731 or transition 713 from a prior state in key phrase model 702. For example, each self loop 741 (or arc) may be associated with or correspond to an output from acoustic scoring module 203. Each of states 721 may have a single self loop 551 or multiple self loops. As discussed with respect to FIG. 5, one or more of states 721 may be silence states having self loops representative of silence. Key phrase model 702 may have any characteristics as discussed with respect to key phrase model 502 of FIG. 5 and such characteristics will not be repeated for the sake of brevity.

Based on rejection model 701 and key phrase model 702, at each or some time instances, a rejection likelihood score and a key phrase likelihood score may be determined. For example, the rejection likelihood score may be a score associated with rejection state 711 of rejection model 701 and the key phrase likelihood score may be a minimum of intermediate scoring state 723, final scoring state 724, and any other scoring states of key phrase model 702. Furthermore, the score of intermediate scoring state 723, final scoring state 724, and any other scoring states of key phrase model 702 may be a retained maximum score for such states. For example, a maximum score at each state may be retained over time for evaluation. For example, the maximum score at each scoring state for a current time instance may not be at the current time instance nor at the same time instance. As is discussed further below, a requirement for determining a key phrase has been detected may also include verifying the order of such maximum scores matches the order of the key phrase. For example, it is not desirable for a second word of a key phrase uttered before a first word of the key phrase to trigger detection of the key phrase.

The key phrase likelihood score for key phrase model 702 may be characterized as an overall key phrase likelihood score, a final key phrase likelihood score, or the like as it may include the evaluation of multiple scoring states as discussed. Although discussed herein with respect to a minimum of intermediate scoring state 723, final scoring state 724, and any other scoring states of key phrase model 702, any suitable combination of such scoring states may be used such as an average, a median, or the like. In an embodiment, the overall key phrase likelihood score for key phrase model 702 may be determined as shown in Equation (2):

$$\text{KPLS}=\min(\text{maxframe}(\text{endstate\_word1}), \text{maxframe}(\text{endstate\_word2})) \quad (2)$$

where KPLS may be the key phrase likelihood score for the key phrase model, endstate_word1 may be a score associated with a state of an endpoint of a first word, phonetic part, or syllable of a key phrase (e.g., intermediate scoring state 723), endstate_word2 may be a score associated with a state of an endpoint of a second word, phonetic part, or syllable of a key phrase (e.g., final scoring state 724), maxframe may provide the maximum retained score for endstate_word1 or endstate_word2, and min may provide the min of the maxframe values. Equation (2) may be extended to include any number of scoring states by providing additional maxframe (endstate_wordN) terms within the min function.

For example, Equation (2) may provide for the maximum scores over a predetermined time period such that the maximum score of one scoring state is associated with a first time instance or time frame (e.g., a first maxframe) and the maximum score of a second scoring state is associated with a second time instance or time frame (e.g., a second maxframe). As shown, the minimum of such maximum retained scores may be provided as the key phrase likelihood score for key phrase model 702.

Returning to FIG. 2, key phrase scores 215 may include any suitable key phrase score that compares the likelihood generated at rejection state 711 with the key phrase likelihood score (e.g., the overall key phrase likelihood score) generated via key phrase model 702. In an embodiment, a key phrase score of key phrase scores 215 may be a log likelihood ratio as discussed above with respect to Equation (1). In an embodiment, a key phrase score of key phrase scores 215 may be provided as shown in Equation (3):

$$\text{KPS}=\min(\text{maxframe}(\log(\text{score\_intermediate})-\log(\text{score\_rejection})), \text{maxframe}(\log(\text{score\_end})-\log(\text{score\_rejection}))) \quad (3)$$

where KPS may be the key phrase score for the key phrase model, score_intermediate may be a score associated with a state of an endpoint of a first word, phonetic part, or syllable of a key phrase (e.g., intermediate scoring state 723), score_rejection may be a score associated with rejection state (e.g., score of rejection state 711), score_end may be a score associated with a state of an endpoint of a second word, phonetic part, or syllable of a key phrase (e.g., final scoring state 724), maxframe may provide the maximum retained score over a time period, and min may provide the min of the provided values. Equation (3) may be extended to include any number of scoring states by providing additional maxframe(*) terms within the min function.

Also as shown, controller 206 may receive key phrase score 215 (e.g., a time series of overall key phrase scores) and controller 206 may compare key phrase score 215 to a threshold or the like to determine whether the predetermined key phrase has been detected. For example, if key phrase score 215 is greater than (or greater than or equal to) the threshold, the predetermined key phrase has been detected and controller 206 may provide system wake indicator 216 to wake system 200. If key phrase score 215 is less than (or less than or equal to) the threshold, the predetermined key phrase has not been detected and controller 206 may not provide system wake indicator 216 and controller may continue to monitor key phrase score 215.

Furthermore, controller 206 may, when key phrase score 215 exceeds (or meets) the threshold, evaluate an order of the time instances associated with the maximum scores of the scoring states. For example, with reference to FIG. 7, the time instance associated with maximum score of intermediate scoring state 723 may be required to be before the maximum score of final scoring state 724. Similarly, if more than two scoring states are used, a verification may be made that the order of the time instances (or time frames) associated with the maximum scores matches the ordering of the scoring states. For example, if the scoring states (SS) are in an order of $SS_1$, $SS_2$, $SS_3$, . . . , $SS_N$, where 1–N indicates the order of the states in key phrase model 702, a verification may be made that time instances of the maximum retained scores are in the same order. For example, the time instances may be placed in order by time and scoring states may be verified to be in order: $TI_1$, $TI_2$, $TI_3$, . . . , $TI_N$, where 1–N indicates the scoring state associated with the time instance. If any of the scoring states are not in order, controller 206 may determine the key phrase has not been matched and monitoring may continue.

As discussed herein and as shown in FIG. 7, in some embodiments, a single key phrase model 702 may be implemented (e.g., for a single key phrase). In other embodiments, multiple key phrase models (e.g., each associated with a different key phrase) may be implemented as discussed herein such that each of the multiple key phrase models may be subsequent to rejection model 701 and connected to rejection model 701 by a transition. Such techniques are discussed with respect to FIGS. 5 and 2 herein and will not be repeated for the sake of brevity.

Furthermore, key phrase model 702 may include one or more backward transitions as discussed with respect to key phrase model 502 of FIG. 5 or key phrase model 502 may include one or more intermediate scoring states as discussed with respect to key phrase model 702 of FIG. 7.

Figure 8:
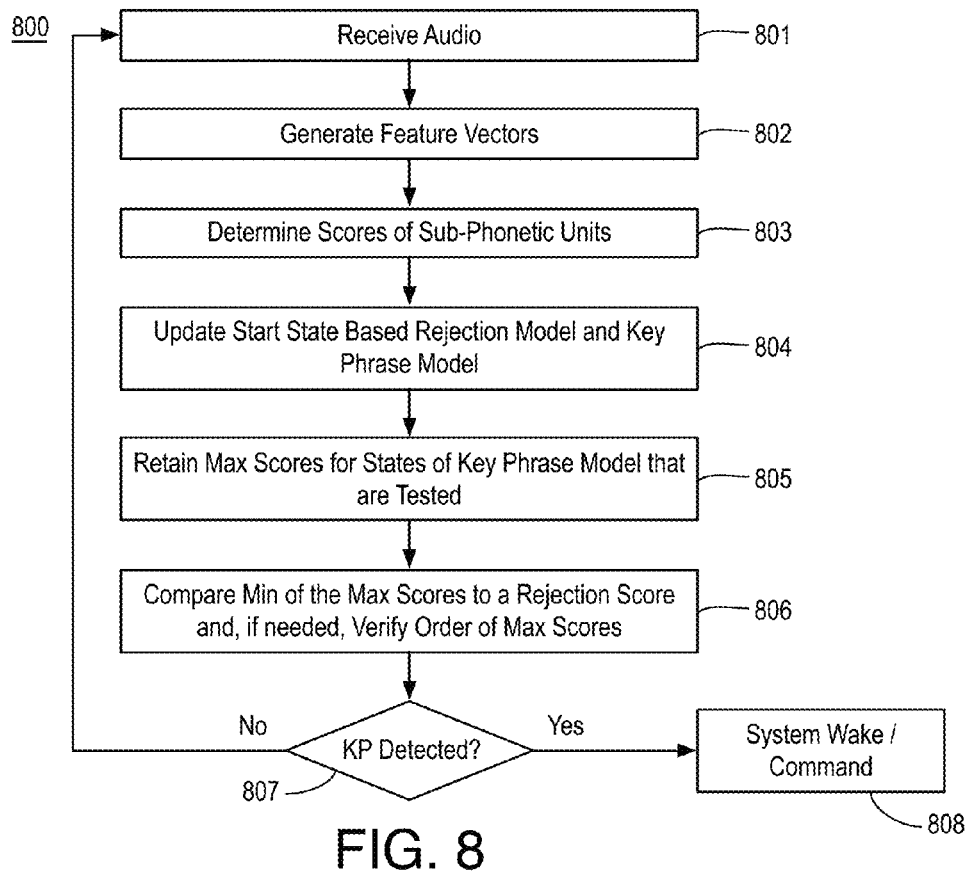
FIG. 8 illustrates an example process for providing key phrase detection including intermediate scoring of the key phrase model.

FIG. 8 illustrates an example process 800 for providing key phrase detection including intermediate scoring of the key phrase model, arranged in accordance with at least some implementations of the present disclosure. Process 800 may include one or more operations 801-808 as illustrated in FIG. 8. Process 800 or portions thereof may be performed by a device or system (e.g., system 200 or any other device or system discussed herein) to detect a key phrase. Process 800 or portions thereof may be repeated for any amount of received audio, for any number of sleep to wake transitions, or the like.

Process 800 may begin at operation 801, where audio input may be received. Audio input may be received using any suitable technique or techniques. In an embodiment, audio input 111 may be received via microphone 201 of system 200 as discussed herein. Processing may continue at operation 802, where feature vectors may be generated using any suitable technique or techniques. In an embodiment, feature vectors 212 may be generated via feature extraction module 202 of system 200 based on audio data 211 as discussed herein. Processing may continue at operation 803, where scores of sub-phonetic units may be determined using any suitable technique or techniques. For example, acoustic scoring module 203 may implement acoustic model 208 such as a deep neural network or the like to determine scores 214 based on feature vectors 212.

Processing may continue at operation 804, where a start based rejection model and a key phrase model may be updated based on the scores of sub-phonetic units. For example, a single state of the rejection model may be updated at each time instance of scores of sub-phonetic units or at regular intervals of scores of sub-phonetic units or the like. Similarly, multiple states of the key phrase model may each be updated at each time instance of scores of sub-phonetic units or at regular intervals of scores of sub-phonetic units or the like. As discussed, the single state of the rejection model may be updated based on the highest probability score associated with one of multiple self loops of the single state and each state of the key phrase model may be updated based on a self loop associated with the state and/or a transition from a previous state in the key phrase model. In an embodiment, key phrase detection decoder 204 of system 200 may implement rejection model 701 and key phrase model 702 having multiple scoring states such as intermediate scoring state 723 and final scoring state 724 as discussed herein.

Processing may continue at operation 805, where maximum scores for each of the scoring states of the key phrase model may be retained. For example, if any of the scoring states at the current time instance or time frame has a score exceeding a previously retained maximum score for the scoring state, the maximum score for the scoring state may be updated with the score of the current time instance. Furthermore, a time stamp or the like associated with the maximum score may be retained for the scoring state.

Processing may continue at operation 806, where the minimum of the maximum retained scores for the scoring stats may be compared to a rejection score and, if needed, the order of the maximum retained scores may be verified. For example, a minimum of the maximum retained scores may be determined as discussed with respect to Equation (2). The minimum may be considered a key phrase likelihood score, an overall key phrase likelihood score, a final key phrase likelihood score, or the like. The overall key phrase likelihood score may then be compared to a rejection score from the rejection model and, based on the comparison and an order of the maximum retained scores, a determination may be made as to whether a key phrase has been detected. For example, a log likelihood score based on the rejection likelihood score and the overall key phrase likelihood score may be determined as discussed with respect to Equation (1) and if the log likelihood score exceeds a threshold and the order of the maximum retained scores matches the predetermined order (e.g., as provided by the key phrase model), a key phrase may be detected.

Processing may continue at operation 807, where a determination may be made as to whether a key phrase has been detected. For example, if the comparison of the overall key phrase likelihood score and the rejection likelihood score as discussed and the order of the maximum scores indicates a key phrase has been detected, processing may continue at operation 808, where a system wake and/or a system command may be provided based on the detected key phrase. The system wake and/or system command may include any suitable command(s) and may be implemented using any suitable technique or techniques. In an embodiment, controller 206 of system 200 may issue system wake indicator and/or system command 218 in response to the key phrase being detected.

If a key phrase has not been detected, processing may continue at operation 801, where additional audio may be received and processing may continue as discussed. For example, process 800 may continue until a key phrase is detected. As discussed herein, in some examples, process 800 may be initiated in response to an initiation signal such as initiation signal 217. Furthermore, in some examples, process 800 may accommodate multiple key phrase models all or some of which may include intermediate scoring. For example, operation 803 may generate all scores needed by such multiple key phrase models, operation 804 may update all such multiple key phrase models, operation 805 may retain maximum scores such multiple key phrase models, operation 806 may compare overall key phrase likelihood scores and rejection scores and verify maximum score orders for all such multiple key phrase models, and decision operation 607 may determine whether a key phrase has been detected for all such multiple key phrase models. If so, operation 808 may provide a wake command and/or a specific command associated with the key phrase detected.

Figure 9:
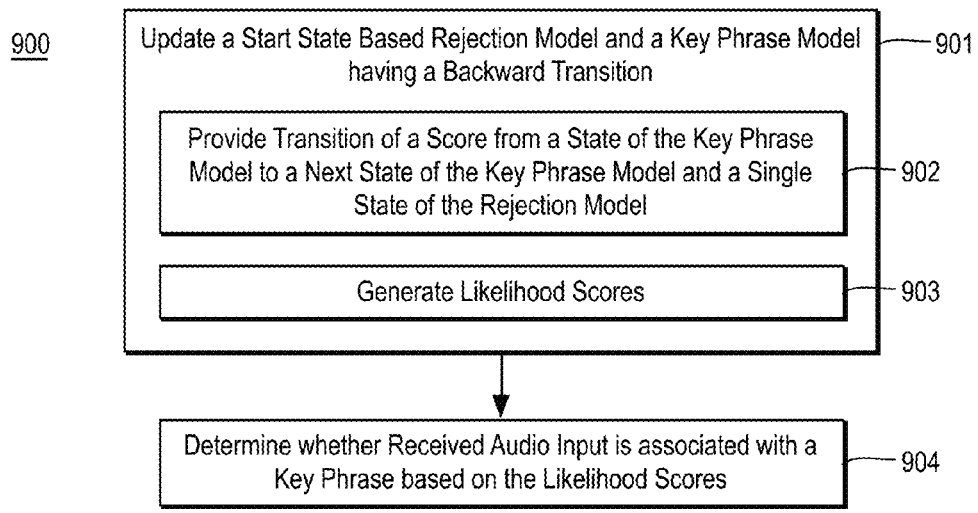
FIG. 9 is a flow diagram illustrating an example process for key phrase detection including a backward transition.

FIG. 9 is a flow diagram illustrating an example process 900 for key phrase detection including a backward transition, arranged in accordance with at least some implementations of the present disclosure. Process 900 may include one or more operations 901-904 as illustrated in FIG. 9. Process 900 may form at least part of a key phrase detection process performed, for example, by system 200. Furthermore, process 900 will be described herein with reference to system 1100 of FIG. 11.

Figure 10:
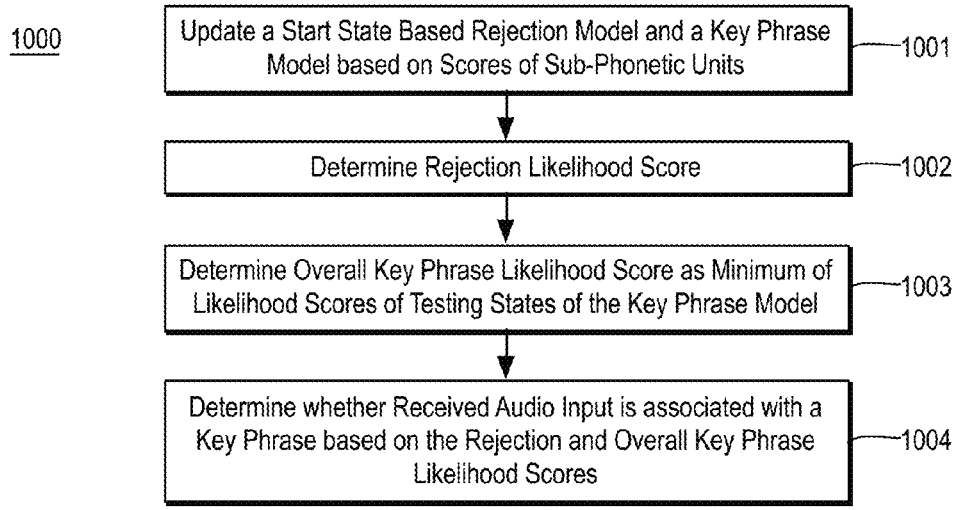
FIG. 10 is a flow diagram illustrating an example process for key phrase detection including intermediate scoring.

FIG. 10 is a flow diagram illustrating an example process 1000 for key phrase detection including intermediate scoring, arranged in accordance with at least some implementations of the present disclosure. Process 1000 may include one or more operations 1001-1004 as illustrated in FIG. 10. Process 1000 may form at least part of a key phrase detection process performed, for example, by system 200. Furthermore, process 1000 will be described herein with reference to system 1100 of FIG. 11.

Figure 11:
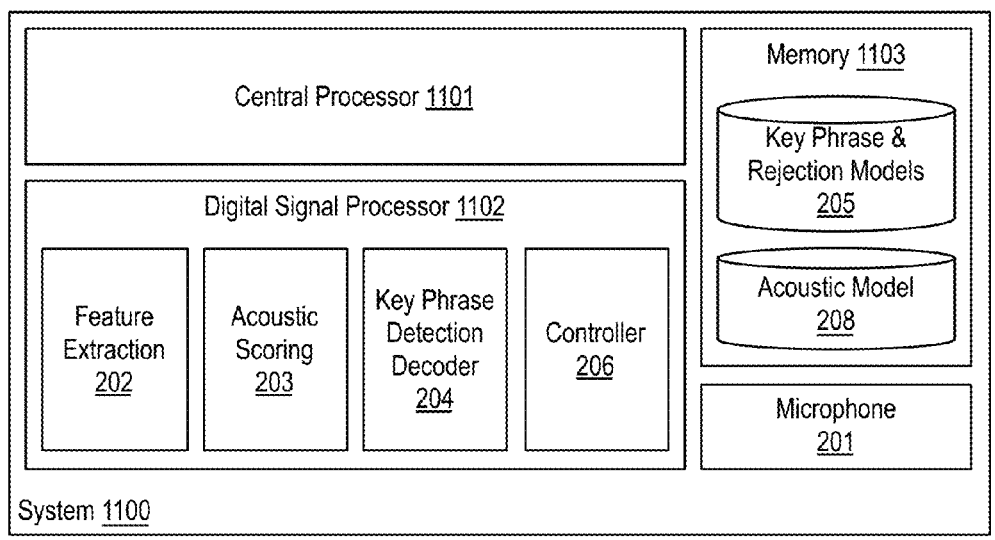
FIG. 11 is an illustrative diagram of an example system for performing key phrase detection.

FIG. 11 is an illustrative diagram of an example system 1100 for performing key phrase detection, arranged in accordance with at least some implementations of the present disclosure. As shown in FIG. 10, system 1100 may include a central processor 1101, a digital signal processor 1102, a memory 1103, and microphone 201. Also as shown, digital signal processor 1102 may include or implement feature extraction module 202, acoustic scoring module 203, key phrase detection decoder 204, and controller 206. In some embodiments, digital signal processor 1102 may also include voice activity detection module 207. Also as shown, memory 1103 may store key phrase and rejection models 205 and acoustic model 208. Memory 1103 may also store audio data, input speech data, voice activity detection parameters or data, coefficient data, feature vectors, scores, output scores, rejection scores, key phrase scores, log likelihood scores, thresholds, or any other data or data structures as discussed herein.

Central processor 1101 and digital signal processor 1102 may include any number and type of processing units that may provide the operations as discussed herein. Such operations may be implemented via software or hardware or a combination thereof. For example, digital signal processor 1102 may include circuitry dedicated to manipulate data obtained from memory 1103 or dedicated memory. Furthermore, central processor 1101 may include any number and type of processing units or modules that may provide control and other high level functions for system 1100 as well as the operations as discussed herein. In the illustrated example, system 1100 may be configured to perform key phrase detection.

Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory. As shown, in an embodiment, feature extraction module 202, acoustic scoring module 203, key phrase detection decoder 204, and controller 206 may be implemented via digital signal processor 1102. In another embodiment, feature extraction module 202, acoustic scoring module 203, key phrase detection decoder 204, and controller 206 may be implemented via central processor 1101. In other embodiments, all or some or portions of feature extraction module 202, acoustic scoring module 203, key phrase detection decoder 204, and controller 206 may be implemented via an execution unit (EU). The EU may include, for example, programmable logic or circuitry such as a logic core or cores that may provide a wide array of programmable logic functions.

Returning to discussion of FIG. 9, process 900 may begin at operation 901, where a start state based rejection model having a single state and a key phrase model having multiple states and associated with a predetermined key phrase may be updated based on scores of sub-phonetic units representative of received audio input. For example, the key phrase model may have a backward transition or multiple backward transitions to the single state of the rejection model. The start state based rejection model and the key phrase model may be updated using any suitable technique or techniques. In an embodiment, key phrase detection decoder 204 as provided via digital signal processor 1102 may implement key phrase and rejection models 205 to update the start state based rejection model and the key phrase model. For example, in the context of process 900, key phrase detection decoder 204 as provided via digital signal processor 1102 may implement rejection model 501 and key phrase model 502. In an embodiment, the single state of the start state based rejection model may include self loops associated with first scores of the scores of sub-phonetic units and the multiple states of the key phrase model may be associated with second scores of the scores of sub-phonetic units such that none of the second scores are included in the first scores. For example, all scores of sub-phonetic units used for the key phrase model may be excluded from the rejection model.

As shown, operation 901 may include operation 902, wherein the updating may include providing a transition of a score from a particular state of the plurality of states of the key phrase model to a next state of the plurality of states of the key phrase model and to the single state of the rejection model. In an embodiment, the particular state may be associated with a word end within the predetermined key phrase. In an embodiment, the updating may include determining a highest probability score from multiple scores of sub-phonetic units associated with the start state based rejection model (e.g., a subset of the scores corresponding to the start state) and adding the highest probability score to a maximum of the score transitioned from the particular state and a previous score of the single state to provide a score of the single state at the current time instance. In an embodiment, the updating may include providing a second transition of a second score from a second state of the plurality of states of the key phrase model to the single state of the rejection model and determining a highest probability score from multiple of the scores of sub-phonetic units associated with the start state based rejection model (e.g., a subset of the scores corresponding to the start state) and adding the highest probability score to a maximum of the score transitioned from the particular state, the second score transitioned from the second state, and a previous score of the single state to provide a score of the single state at the current time instance. In an embodiment, the updating may include determining a score from the scores of sub-phonetic units corresponding to the next state and adding the score to a maximum of the score transitioned from the particular state and a previous score of the next state to provide a score of the next state at the current time instance.

Furthermore, operation 901 may include operation 903, where the updating may include generating a rejection likelihood score corresponding to the single state of the start state based rejection model and a key phrase likelihood score corresponding to the key phrase model. For example, the rejection likelihood score may be the score corresponding to the single state of the start state based rejection model and the key phrase likelihood score may be the score corresponding to a scoring state of the key phrase model. In an embodiment, the key phrase likelihood score may be associated with a final state of the key phrase model. In an embodiment, the key phrase likelihood score may be a minimum of a first likelihood score associated with a first state of the key phrase model and a second likelihood score associated with a second state of the key phrase model. For example, the first state may be at the end of a first word of the key phrase and the second state may be at the end of a second word or the end itself of the key phrase.

Processing may continue at operation 904, where a determination may be made as whether the received audio input is associated with the predetermined key phrase based on the rejection likelihood score and the key phrase likelihood score. Such a determination may be made using any suitable technique or techniques. In an embodiment, controller 206 as provided via digital signal processor 1102 may determine whether the received audio input is associated with the predetermined key phrase. In an embodiment, determining whether the received audio input is associated with the predetermined key phrase may include determining a log likelihood score based on the rejection likelihood score and the key phrase likelihood score and comparing the log likelihood score to a threshold.

Turning now to discussion of FIG. 10, process 1000 may begin at operation 1001, where a start state based rejection model and a key phrase associated with a predetermined key phrase may be updated based on scores of sub-phonetic units representative of received audio input. For example, the start state based rejection model may have a single state and the key phrase model may have multiple states as discussed herein. The start state based rejection model and the key phrase model may be updated using any suitable technique or techniques. In an embodiment, key phrase detection decoder 204 as provided via digital signal processor 1102 to implement key phrase and rejection models 205 may update the start state based rejection model and the key phrase model. For example, in the context of process 1000, key phrase detection decoder 204 as provided via digital signal processor 1102 may implement rejection model 701 and key phrase model 702. In an embodiment, the start state based rejection model consists of a single state comprising self loops associated with at least some of the scores of sub-phonetic units of the acoustic model. In an embodiment, the single state of the start state based rejection model may include self loops associated with first scores of the scores of sub-phonetic units and the multiple states of the key phrase model may be associated with second scores of the scores of sub-phonetic units such that none of the second scores are included in the first scores. For example, all scores of sub-phonetic units used for the key phrase model may be excluded from the rejection model.

Processing may continue at operation 1002, where a rejection likelihood score may be determined based on the updated start state based rejection model. The rejection likelihood score may be determined using any suitable technique or techniques. In an embodiment, the rejection likelihood score may be determined by key phrase detection decoder 204 as provided via digital signal processor 1102. For example, the rejection likelihood score may be the state of the single state of the rejection model.

Processing may continue at operation 1003, where an overall key phrase likelihood score may be determined based on the updated key phrase model. For example, the overall key phrase likelihood score may be a minimum of a first likelihood score associated with a first state of the key phrase model and a second likelihood score associated with a second state of the key phrase model. The overall key phrase likelihood score may be determined using any suitable technique or techniques. In an embodiment, the overall key phrase likelihood score may be determined by key phrase detection decoder 204 as provided via digital signal processor 1102. In an embodiment, the first likelihood score may be a maximum first likelihood score attained at the first state over a particular time interval and the second likelihood score may be a maximum second likelihood score attained at the second state over the particular time interval. As discussed, in some embodiments, such intermediate scoring techniques may include scoring two states of the key phrase model (e.g., an intermediate state and a final state). In an embodiment, the first state may correspond to an endpoint of a first word of the key phrase model and the second state may correspond to an endpoint of a second word (e.g., a final word) of the key phrase model. However, any number of states of the key phrase model may be scored and, at operation 1003, the minimum of the maximum retained scores corresponding to such scoring states may be determined.

Processing may continue at operation 1004, where a determination may be made as whether the received audio input is associated with the predetermined key phrase based on the rejection likelihood score and the overall key phrase likelihood score. Such a determination may be made using any suitable technique or techniques. In an embodiment, controller 206 as provided via digital signal processor 1102 may determine whether the received audio input is associated with the predetermined key phrase. In an embodiment, determining whether the received audio input is associated with the predetermined key phrase may include determining a log likelihood score based on the rejection likelihood score and the overall key phrase likelihood score and comparing the log likelihood score to a threshold. As discussed, in some embodiments, determining whether the received audio input is associated with the predetermined key phrase may include verifying an order of the retained maximum scores. In an embodiment, the first likelihood score corresponds to a first time instance and the second likelihood score corresponds to a second time instance and determining whether the received audio input is associated with the predetermined key phrase includes verifying the second time instance is subsequent to the first time instance. For example, if the second time instance was prior to the first time instance, no key phrase detection may be provided at operation 1004.

Process 900 and/or process 1000 may also include generating scores of sub-phonetic units representative of received audio as discussed herein. For example, audio may be received via microphone and audio data corresponding therewith may be stored to memory 1103. Furthermore, feature extraction module 202 as implemented via digital signal processor 1102 may generate a time series of feature vectors representative of the received audio input as discussed herein based on the stored audio data. Acoustic scoring module 203 as implemented via digital signal processor 1102 may generate the scores of sub-phonetic units (e.g., time series of scores of sub-phonetic units) based on the time series of feature vectors and acoustic model 208 stored in memory 1103. In an embodiment, acoustic scoring module 203 is a deep neural network and the time series of feature vectors includes a first feature vector including a stack of a time series of coefficients each associated with a sampling time.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
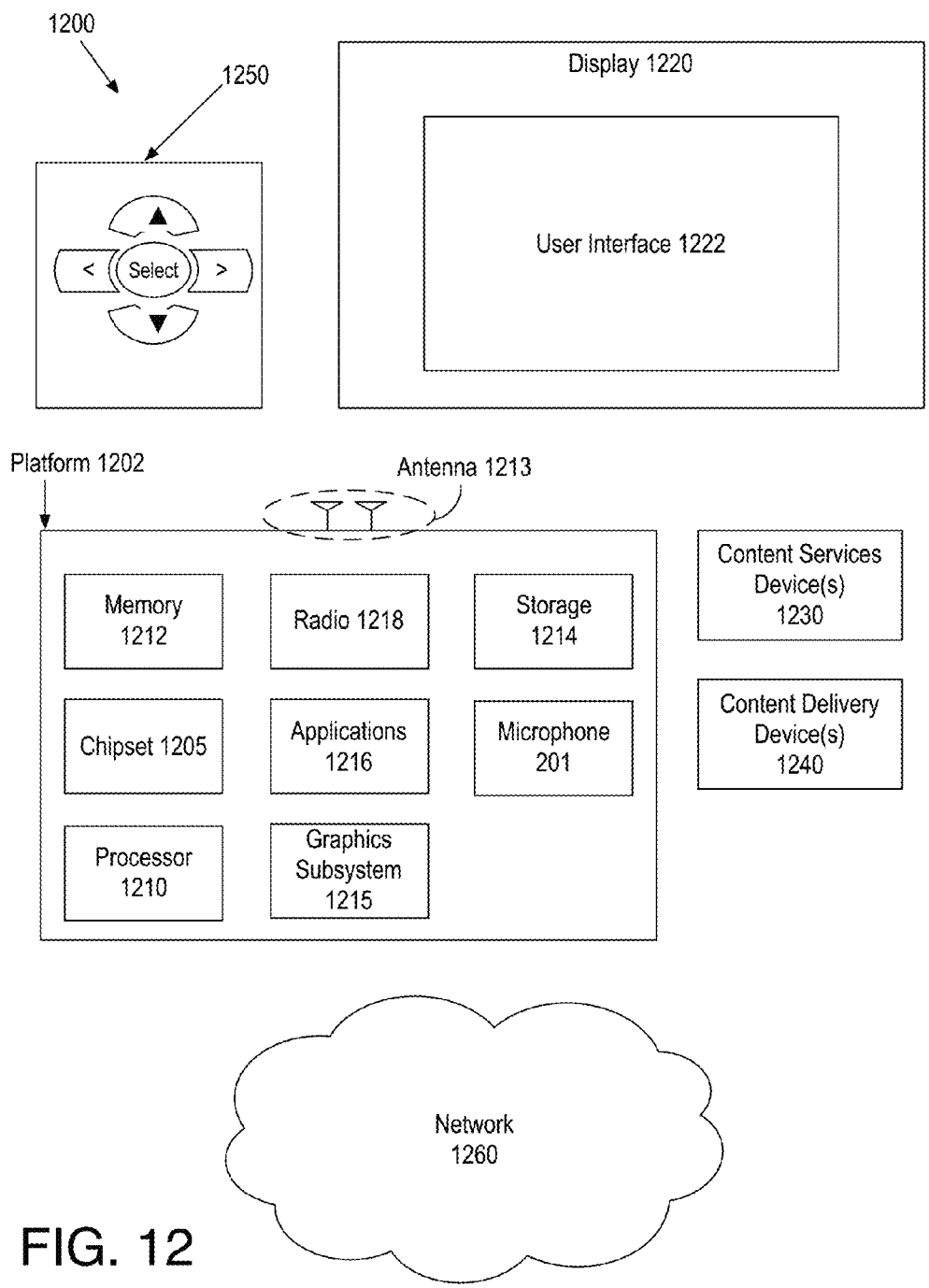
FIG. 12 is an illustrative diagram of an example system.

FIG. 12 is an illustrative diagram of an example system 1200, arranged in accordance with at least some implementations of the present disclosure. In various implementations, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. As shown, in some examples, system 1200 may include microphone 201 implemented via platform 1202. Platform 1202 may receive input speech via microphone 201 as discussed herein. A navigation controller 1250 including one or more navigation features may be used to interact with, for example, platform 1202 and/or display 1220. Each of these components is described in greater detail below.

In various implementations, system 1200 may provide key phrase detection as described. For example, key phrase detection may be provide wake on voice capability for a device or environment as described. In other implementations, system 1200 may provide for generating a key phrase detection model (e.g., including an acoustic model, a rejection model, and a key phrase model). Such training may be performed offline prior to key phrase detection for example.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1215. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
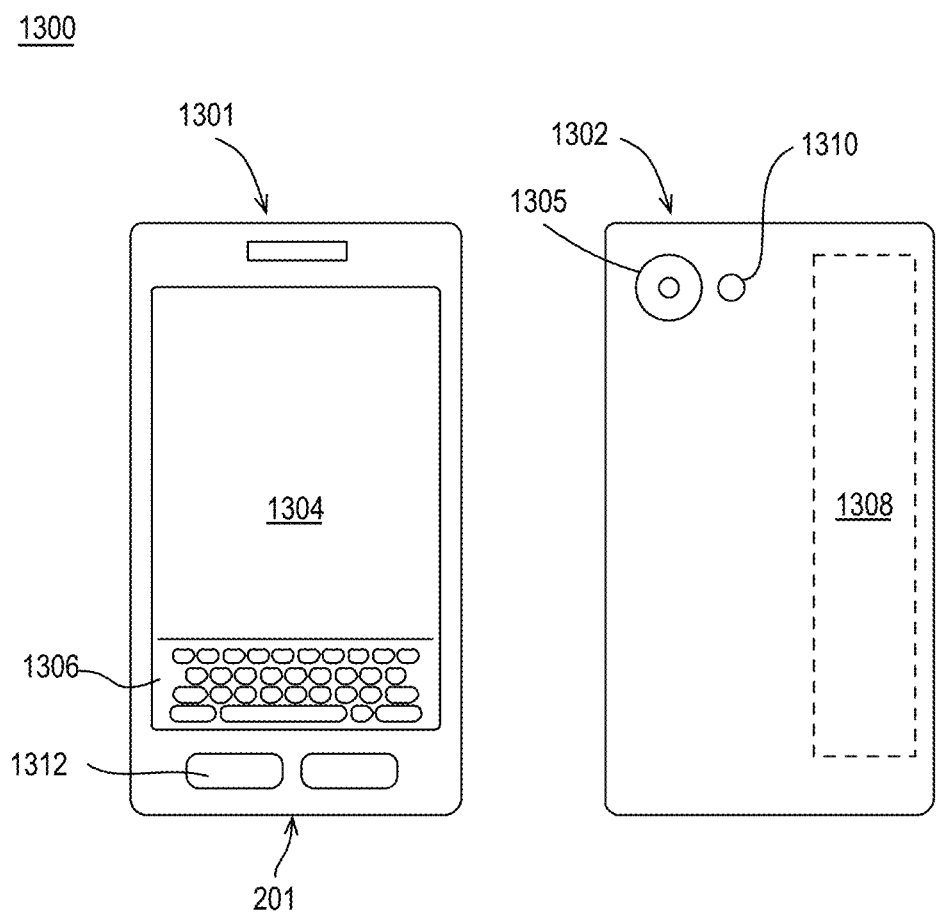
FIG. 13 illustrates an example device, all arranged in accordance with at least some implementations of the present disclosure.

As described above, system 1200 may be embodied in varying physical styles or form factors. FIG. 13 illustrates implementations of a small form factor device, arranged in accordance with at least some implementations of the present disclosure. In some examples, system 1200 may be implemented via device 1300. In other examples, other devices or systems, or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone 201, or may be digitized by a voice recognition device. As shown, device 1300 may include a camera 1305 (e.g., including a lens, an aperture, and an imaging sensor) and a flash 1310 integrated into back 1302 (or elsewhere) of device 1300.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for key phrase detection comprises generating, via acoustic scoring of an acoustic model, a time series of scores of sub-phonetic units based on a time series of feature vectors representative of received audio input, updating a start state based rejection model and a key phrase model associated with a predetermined key phrase based on at least some of the time series of scores of sub-phonetic units to generate a rejection likelihood score and a key phrase likelihood score, and determining whether the received audio input is associated with the predetermined key phrase based on the rejection likelihood score and the key phrase likelihood score.

In one or more first embodiments, a computer-implemented method for key phrase detection comprises updating, at a current time instance, a start state based rejection model having a single state and a key phrase model having a plurality of states and associated with a predetermined key phrase based on scores of sub-phonetic units representative of received audio input, wherein said updating comprises providing a transition of a score from a particular state of the plurality of states of the key phrase model to a next state of the plurality of states of the key phrase model and to the single state of the rejection model and generating a rejection likelihood score corresponding to the single state of the start state based rejection model and a key phrase likelihood score corresponding to the key phrase model, and determining whether the received audio input is associated with the predetermined key phrase based on the rejection likelihood score and the key phrase likelihood score.

Further to the first embodiments, said updating comprises determining a highest probability score from a plurality of the scores of sub-phonetic units associated with the start state based rejection model and adding the highest probability score to a maximum of the score transitioned from the particular state and a previous score of the single state to provide a score of the single state at the current time instance.

Further to the first embodiments, said updating comprises providing a second transition of a second score from a second state of the plurality of states of the key phrase model to the single state of the rejection model and determining a highest probability score from a plurality of the scores of sub-phonetic units associated with the start state based rejection model and adding the highest probability score to a maximum of the score transitioned from the particular state, the second score transitioned from the second state, and a previous score of the single state to provide a score of the single state at the current time instance.

Further to the first embodiments, the single state of the start state based rejection model comprises self loops associated with first scores of the scores of sub-phonetic units and the plurality of states of the key phrase model are associated with second scores of the scores of sub-phonetic units, and wherein none of the second scores are included in the first scores.

Further to the first embodiments, the key phrase likelihood score comprises a minimum of a first likelihood score associated with a first state of the key phrase model and a second likelihood score associated with a second state of the key phrase model.

Further to the first embodiments, the particular state of the key phrase model is associated with a word end within the predetermined key phrase.

Further to the first embodiments, said updating comprises determining a score from the scores of sub-phonetic units corresponding to the next state and adding the score to a maximum of the score transitioned from the particular state and a previous score of the next state to provide a score of the next state at the current time instance.

Further to the first embodiments, the key phrase likelihood score is associated with a final state of the key phrase model.

Further to the first embodiments, determining whether the received audio input is associated with the predetermined key phrase comprises determining a log likelihood score based on the rejection likelihood score and the key phrase likelihood score and comparing the log likelihood score to a threshold.

In one or more second embodiments, system for performing key phrase detection comprises a memory configured to store an acoustic model, a start state based rejection model, and a key phrase model associated with a predetermined key phrase and a digital signal processor coupled to the memory, the digital signal processor to update, at a current time instance, the start state based rejection model having a single state and the key phrase model having a plurality of states based on scores of sub-phonetic units representative of received audio input, wherein to update the start state based rejection model and the key phrase model, the digital signal processor is to provide a transition of a score from a particular state of the plurality of states of the key phrase model to a next state of the plurality of states of the key phrase model and to the single state of the rejection model and to generate a rejection likelihood score corresponding to the single state of the start state based rejection model and a key phrase likelihood score corresponding to the key phrase model and to determine whether the received audio input is associated with the predetermined key phrase based on the rejection likelihood score and the key phrase likelihood score.

Further to the second embodiments, to update the start state based rejection model and the key phrase model, the digital signal processor is to determine a highest probability score from a plurality of the scores of sub-phonetic units associated with the start state based rejection model and add the highest probability score to a maximum of the score transitioned from the particular state and a previous score of the single state to provide a score of the single state at the current time instance.

Further to the second embodiments, to update the start state based rejection model and the key phrase model, the digital signal processor is to provide a second transition of a second score from a second state of the plurality of states of the key phrase model to the single state of the rejection model and to determine a highest probability score from a plurality of the scores of sub-phonetic units associated with the start state based rejection model and add the highest probability score to a maximum of the score transitioned from the particular state, the second score transitioned from the second state, and a previous score of the single state to provide a score of the single state at the current time instance.

Further to the second embodiments, the single state of the start state based rejection model comprises self loops associated with first scores of the scores of sub-phonetic units and the plurality of states of the key phrase model are associated with second scores of the scores of sub-phonetic units, and none of the second scores are included in the first scores.

Further to the second embodiments, the key phrase likelihood score comprises a minimum of a first likelihood score associated with a first state of the key phrase model and a second likelihood score associated with a second state of the key phrase model.

Further to the second embodiments, the particular state of the key phrase model is associated with a word end within the predetermined key phrase.

Further to the second embodiments, the digital signal processor to update the start state based rejection model and the key phrase model comprises the digital signal processor to determine a score from the scores of sub-phonetic units corresponding to the next state and to add the score to a maximum of the score transitioned from the particular state and a previous score of the next state to provide a score of the next state at the current time instance.

Further to the second embodiments, the key phrase likelihood score is associated with a final state of the key phrase model.

Further to the second embodiments, the digital signal processor to determine whether the received audio input is associated with the predetermined key phrase comprises the digital signal processor to determine a log likelihood score based on the rejection likelihood score and the key phrase likelihood score and to compare the log likelihood score to a threshold.

In one or more third embodiments, a system comprises means for updating, at a current time instance, a start state based rejection model having a single state and a key phrase model having a plurality of states and associated with a predetermined key phrase based on scores of sub-phonetic units representative of received audio input, wherein the means for updating comprise means for providing a transition of a score from a particular state of the plurality of states of the key phrase model to a next state of the plurality of states of the key phrase model and to the single state of the rejection model and means for generating a rejection likelihood score corresponding to the single state of the start state based rejection model and a key phrase likelihood score corresponding to the key phrase model, and means for determining whether the received audio input is associated with the predetermined key phrase based on the rejection likelihood score and the key phrase likelihood score.

Further to the third embodiments, the means for updating comprise means for determining a highest probability score from a plurality of the scores of sub-phonetic units associated with the start state based rejection model and means for adding the highest probability score to a maximum of the score transitioned from the particular state and a previous score of the single state to provide a score of the single state at the current time instance.

Further to the third embodiments, the means for updating comprise means for providing a second transition of a second score from a second state of the plurality of states of the key phrase model to the single state of the rejection model and means for determining a highest probability score from a plurality of the scores of sub-phonetic units associated with the start state based rejection model and means for adding the highest probability score to a maximum of the score transitioned from the particular state, the second score transitioned from the second state, and a previous score of the single state to provide a score of the single state at the current time instance.

Further to the third embodiments, the single state of the start state based rejection model comprises self loops associated with first scores of the scores of sub-phonetic units and the plurality of states of the key phrase model are associated with second scores of the scores of sub-phonetic units, and none of the second scores are included in the first scores.

Further to the third embodiments, the key phrase likelihood score comprises a minimum of a first likelihood score associated with a first state of the key phrase model and a second likelihood score associated with a second state of the key phrase model.

In one or more fourth embodiments, at least one machine readable medium comprises a plurality of instructions that, in response to being executed on a device, cause the device to provide key phrase detection by updating, at a current time instance, a start state based rejection model having a single state and a key phrase model having a plurality of states and associated with a predetermined key phrase based on scores of sub-phonetic units representative of received audio input, wherein said updating comprises providing a transition of a score from a particular state of the plurality of states of the key phrase model to a next state of the plurality of states of the key phrase model and to the single state of the rejection model and generating a rejection likelihood score corresponding to the single state of the start state based rejection model and a key phrase likelihood score corresponding to the key phrase model, and determining whether the received audio input is associated with the predetermined key phrase based on the rejection likelihood score and the key phrase likelihood score.

Further to the fourth embodiments, said updating comprises determining a highest probability score from a plurality of the scores of sub-phonetic units associated with the start state based rejection model and adding the highest probability score to a maximum of the score transitioned from the particular state and a previous score of the single state to provide a score of the single state at the current time instance.

Further to the fourth embodiments, said updating comprises providing a second transition of a second score from a second state of the plurality of states of the key phrase model to the single state of the rejection model and determining a highest probability score from a plurality of the scores of sub-phonetic units associated with the start state based rejection model and adding the highest probability score to a maximum of the score transitioned from the particular state, the second score transitioned from the second state, and a previous score of the single state to provide a score of the single state at the current time instance.

Further to the fourth embodiments, the single state of the start state based rejection model comprises self loops associated with first scores of the scores of sub-phonetic units and the plurality of states of the key phrase model are associated with second scores of the scores of sub-phonetic units, and none of the second scores are included in the first scores.

Further to the fourth embodiments, the key phrase likelihood score comprises a minimum of a first likelihood score associated with a first state of the key phrase model and a second likelihood score associated with a second state of the key phrase model.

In one or more fifth embodiments, a computer-implemented method for key phrase detection comprises updating a start state based rejection model and a key phrase model associated with a predetermined key phrase based on scores of sub-phonetic units representative of received audio input, determining a rejection likelihood score based on the updated start state based rejection model, determining an overall key phrase likelihood score comprising a minimum of a first likelihood score associated with a first state of the key phrase model and a second likelihood score associated with a second state of the key phrase model, and determining whether the received audio input is associated with the predetermined key phrase based on the rejection likelihood score and the overall key phrase likelihood score.

Further to the fifth embodiments, the first likelihood score is a maximum first likelihood score attained at the first state over a particular time interval and the second likelihood score is a maximum second likelihood score attained at the second state over the particular time interval.

Further to the fifth embodiments, the first likelihood score corresponds to a first time instance and the second likelihood score corresponds to a second time instance.

Further to the fifth embodiments, the first likelihood score corresponds to a first time instance and the second likelihood score corresponds to a second time instance, and determining whether the received audio input is associated with the predetermined key phrase comprises verifying the second time instance is subsequent to the first time instance.

Further to the fifth embodiments, the first state corresponds to an endpoint of a first word of the key phrase model and the second state corresponds to an endpoint of a second word of the key phrase model.

Further to the fifth embodiments, determining whether the received audio input is associated with the predetermined key phrase comprises determining a log likelihood score based on the rejection likelihood score and the overall key phrase likelihood score and comparing the log likelihood score to a threshold.

Further to the fifth embodiments, the start state based rejection model consists of a single state comprising self loops associated with at least some of the scores of sub-phonetic units of the acoustic model.

In one or more sixth embodiments, a system for performing key phrase detection comprises a memory configured to store an acoustic model, a start state based rejection model, and a key phrase model associated with a predetermined key phrase and a digital signal processor coupled to the memory, the digital signal processor to update a start state based rejection model and a key phrase model associated with a predetermined key phrase based on scores of sub-phonetic units representative of received audio input, to determine a rejection likelihood score based on the updated start state based rejection model, to determine an overall key phrase likelihood score comprising a minimum of a first likelihood score associated with a first state of the key phrase model and a second likelihood score associated with a second state of the key phrase model, and to determine whether the received audio input is associated with the predetermined key phrase based on the rejection likelihood score and the overall key phrase likelihood score.

Further to the sixth embodiments, the first likelihood score is a maximum first likelihood score attained at the first state over a particular time interval and the second likelihood score is a maximum second likelihood score attained at the second state over the particular time interval.

Further to the sixth embodiments, the first likelihood score corresponds to a first time instance and the second likelihood score corresponds to a second time instance.

Further to the sixth embodiments, the first likelihood score corresponds to a first time instance and the second likelihood score corresponds to a second time instance, and the digital signal processor to determine whether the received audio input is associated with the predetermined key phrase comprises the digital signal processor to verify the second time instance is subsequent to the first time instance.

Further to the sixth embodiments, the first state corresponds to an endpoint of a first word of the key phrase model and the second state corresponds to an endpoint of a second word of the key phrase model.

Further to the sixth embodiments, the digital signal processor to determine whether the received audio input is associated with the predetermined key phrase comprises the digital signal processor to determine a log likelihood score based on the rejection likelihood score and the overall key phrase likelihood score and to compare the log likelihood score to a threshold.

Further to the sixth embodiments, the start state based rejection model consists of a single state comprising self loops associated with at least some of the scores of sub-phonetic units of the acoustic model.

In one or more seventh embodiments, a system comprises means for updating a start state based rejection model and a key phrase model associated with a predetermined key phrase based on scores of sub-phonetic units representative of received audio input, means for determining a rejection likelihood score based on the updated start state based rejection model, means for determining an overall key phrase likelihood score comprising a minimum of a first likelihood score associated with a first state of the key phrase model and a second likelihood score associated with a second state of the key phrase model, and means for determining whether the received audio input is associated with the predetermined key phrase based on the rejection likelihood score and the overall key phrase likelihood score.

Further to the seventh embodiments, the first likelihood score is a maximum first likelihood score attained at the first state over a particular time interval and the second likelihood score is a maximum second likelihood score attained at the second state over the particular time interval.

Further to the seventh embodiments, the first likelihood score corresponds to a first time instance and the second likelihood score corresponds to a second time instance.

Further to the seventh embodiments, the first likelihood score corresponds to a first time instance and the second likelihood score corresponds to a second time instance, and the means for determining whether the received audio input is associated with the predetermined key phrase comprise means for verifying the second time instance is subsequent to the first time instance.

Further to the seventh embodiments, the first state corresponds to an endpoint of a first word of the key phrase model and the second state corresponds to an endpoint of a second word of the key phrase model.

In one or more eighth embodiments, at least one machine readable medium comprises a plurality of instructions that, in response to being executed on a device, cause the device to provide key phrase detection by updating a start state based rejection model and a key phrase model associated with a predetermined key phrase based on scores of sub-phonetic units representative of received audio input, determining a rejection likelihood score based on the updated start state based rejection model, determining an overall key phrase likelihood score comprising a minimum of a first likelihood score associated with a first state of the key phrase model and a second likelihood score associated with a second state of the key phrase model, and determining whether the received audio input is associated with the predetermined key phrase based on the rejection likelihood score and the overall key phrase likelihood score.

Further to the eighth embodiments, the first likelihood score is a maximum first likelihood score attained at the first state over a particular time interval and the second likelihood score is a maximum second likelihood score attained at the second state over the particular time interval.

Further to the eighth embodiments, the first likelihood score corresponds to a first time instance and the second likelihood score corresponds to a second time instance.

Further to the eighth embodiments, the first likelihood score corresponds to a first time instance and the second likelihood score corresponds to a second time instance and determining whether the received audio input is associated with the predetermined key phrase comprises verifying the second time instance is subsequent to the first time instance.

Further to the eighth embodiments, the first state corresponds to an endpoint of a first word of the key phrase model and the second state corresponds to an endpoint of a second word of the key phrase model.

In one or more ninth embodiments, at least one machine readable medium may include a plurality of instructions that, in response to being executed on a computing device, cause the computing device to perform a method or any functions according to any one of the above embodiments.

In one or more tenth embodiments, an apparatus or a system may include means for performing a method or any functions according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for key phrase detection comprising:
    updating, at a current time instance, a start state based rejection model and a key phrase model associated with a predetermined key phrase based on scores of sub-phonetic units representative of received audio input, wherein the start state based rejection model includes a single rejection state having a plurality of rejection model self loops each associated with a particular score of the scores of sub-phonetic units, wherein the key phrase model includes a plurality of key phrase states interconnected by transitions therebetween, wherein the start state based rejection model and the key phrase model are connected by a first transition from the single rejection state to a first key phrase state of the plurality of key phrase states, and wherein said updating comprises:
        transitioning a score from a particular key phrase state of the plurality of key phrase states of the key phrase model to a next key phrase state of the plurality of key phrase states of the key phrase model;
        transitioning the score from the particular key phrase state to the single rejection state of the start state based rejection model; and
        generating a rejection likelihood score corresponding to the single rejection state of the start state based rejection model and a key phrase likelihood score corresponding to the key phrase model; and
    detecting the predetermined key phrase in the received audio input based on the rejection likelihood score and the key phrase likelihood score; and
    providing a wake indicator or a command in response to the detected predetermined key phrase.

2. The method of claim 1, wherein said updating comprises determining a highest probability score from the particular scores of sub-phonetic units associated with the rejection model self loops of the start state based rejection model and adding the highest probability score to a maximum of the score transitioned from the particular key phrase state and a previous score of the single rejection state to provide a score of the single rejection state at the current time instance.

3. The method of claim 1, wherein said updating comprises:
    transitioning a second score from a second key phrase state of the plurality of key phrase states of the key phrase model to the single rejection state of the start state based rejection model; and
    determining a highest probability score from the particular scores of sub-phonetic units associated with the rejection model self loops of the start state based rejection model and adding the highest probability score to a maximum of the score transitioned from the particular key phrase state, the second score transitioned from the second key phrase state, and a previous score of the single rejection state to provide a score of the single rejection state at the current time instance.

4. The method of claim 1, wherein the plurality of key phrase states of the key phrase model are associated with second scores of the scores of sub-phonetic units, and wherein none of the second scores are included in the particular scores of sub-phonetic units associated with the rejection model self loops of the start state based rejection model.

5. The method of claim 1, wherein the key phrase likelihood score comprises a minimum of a first likelihood score associated with a second key phrase state of the key phrase model and a second likelihood score associated with a third key phrase state of the key phrase model.

6. The method of claim 1, wherein the particular key phrase state of the key phrase model is associated with a word end within the predetermined key phrase.

7. The method of claim 1, wherein said updating comprises determining a second score from the scores of sub-phonetic units corresponding to the next key phrase state and adding the second score to a maximum of the score transitioned from the particular key phrase state and a previous score of the next key phrase state to provide a current score of the next key phrase state at the current time instance.

8. The method of claim 1, wherein the key phrase likelihood score is associated with a final key phrase state of the key phrase model.

9. The method of claim 1, wherein determining whether the received audio input is associated with the predetermined key phrase comprises determining a log likelihood score based on the rejection likelihood score and the key phrase likelihood score and comparing the log likelihood score to a threshold.

10. A computer-implemented method for key phrase detection comprising:
updating a start state based rejection model and a key phrase model associated with a predetermined key phrase based on scores of sub-phonetic units representative of received audio input, wherein the start state based rejection model includes a single rejection state having a plurality of rejection model self loops each associated with a particular score of the scores of sub-phonetic units and wherein the key phrase model includes a plurality of key phrase states interconnected by transitions therebetween, the start state based rejection model and the key phrase model being connected by a first transition from the single rejection state to a first key phrase state of the plurality of key phrase states;
determining a rejection likelihood score based on the single rejection state of the updated start state based rejection model;
determining an overall key phrase likelihood score comprising a minimum of only a subset of likelihood scores associated with a corresponding subset of key phrase states of the key phrase model including at least a first likelihood score associated with a first key phrase state corresponding to an end of a first portion of the key phrase and a second likelihood score associated with a final key phrase state of the key phrase model corresponding to an end of a second portion of the key phrase; and
detecting the predetermined key phrase in the received audio input based on the rejection likelihood score and the key phrase likelihood score; and
providing a wake indicator or a command in response to the detected predetermined key phrase.

11. The method of claim 10, wherein the first likelihood score is a maximum first likelihood score attained at the first key phrase state over a particular time interval and the second likelihood score is a maximum second likelihood score attained at the final key phrase state over the particular time interval.

12. The method of claim 10, wherein the first likelihood score corresponds to a first time instance and the second likelihood score corresponds to a second time instance.

13. The method of claim 12, wherein determining whether the received audio input is associated with the predetermined key phrase comprises verifying the second time instance is subsequent to the first time instance.

14. The method of claim 10, wherein the first key phrase state corresponds to an endpoint of a first word of the key phrase model and the final key phrase state corresponds to an endpoint of a second word of the key phrase model.

15. The method of claim 10, wherein determining whether the received audio input is associated with the predetermined key phrase comprises determining a log likelihood score based on the rejection likelihood score and the overall key phrase likelihood score and comparing the log likelihood score to a threshold.

16. A system for performing key phrase detection comprising:
a memory configured to store a start state based rejection model and a key phrase model associated with a predetermined key phrase;
a digital signal processor coupled to the memory, the digital signal processor to update, at a current time instance, the start state based rejection model and the key phrase model based on scores of sub-phonetic units representative of received audio input, wherein the start state based rejection model includes a single rejection state having a plurality of rejection model self loops each associated with a particular score of the scores of sub-phonetic units, wherein the key phrase model includes a plurality of key phrase states interconnected by transitions therebetween, wherein the start state based rejection model and the key phrase model are connected by a first transition from the single rejection state to a first key phrase state of the plurality of key phrase states, and wherein to update the start state based rejection model and the key phrase model, the digital signal processor is to transition a score from a particular key phrase state of the plurality of key phrase states of the key phrase model to a next key phrase state of the plurality of key phrase states of the key phrase model, to transition the score from the particular key phrase state to the single rejection state of the start state based rejection model, and to generate a rejection likelihood score corresponding to the single rejection state of the start state based rejection model and a key phrase likelihood score corresponding to the key phrase model; and
detect the predetermined key phrase in the received audio input based on the rejection likelihood score and the key phrase likelihood score; and
provide a wake indicator or a command in response to the detected predetermined key phrase.

17. The system of claim 16, wherein to update the start state based rejection model and the key phrase model, the digital signal processor is to determine a highest probability score from the particular scores of sub-phonetic units associated with the rejection model self loops of the start state based rejection model and to add the highest probability score to a maximum of the score transitioned from the particular key phrase state and a previous score of the single rejection state to provide a score of the single rejection state at the current time instance.

18. The system of claim 16, wherein to update the start state based rejection model and the key phrase model, the digital signal processor is to transition a second score from a second key phrase state of the plurality of key phrase states of the key phrase model to the single rejection state of the start state based rejection model and to determine a highest probability score from the particular scores of sub-phonetic units associated with the rejection model self loops of the start state based rejection model and to add the highest probability score to a maximum of the score transitioned from the particular key phrase state, the second score transitioned from the second key phrase state, and a previous score of the single rejection state to provide a score of the single rejection state at the current time instance.

19. The system of claim 16, wherein the plurality of key phrase states of the key phrase model are associated with second scores of the scores of sub-phonetic units, and wherein none of the second scores are included in the particular scores of sub-phonetic units associated with the rejection model self loops of the start state based rejection model.

20. The system of claim 16, wherein the key phrase likelihood score comprises a minimum of a first likelihood score associated with a second key phrase state of the key phrase model and a second likelihood score associated with a third key phrase state of the key phrase model.

21. A system for performing key phrase detection comprising:
  a memory configured to store a start state based rejection model and a key phrase model associated with a predetermined key phrase; and
  a digital signal processor coupled to the memory, the digital signal processor to update the start state based rejection model and the key phrase model based on scores of sub-phonetic units representative of received audio input, wherein the start state based rejection model includes a single rejection state having a plurality of rejection model self loops each associated with a particular score of the scores of sub-phonetic units and wherein the key phrase model includes a plurality of key phrase states interconnected by transitions therebetween, the start state based rejection model and the key phrase model being connected by a first transition from the single rejection state to a first key phrase state of the plurality of key phrase states, to determine a rejection likelihood score based on the single rejection state of the updated start state based rejection model, to determine an overall key phrase likelihood score comprising a minimum of only a subset of likelihood scores associated with a corresponding subset of key phrase states of the key phrase model including at least a first likelihood score associated with a first key phrase state corresponding to an end of a first portion of the key phrase and a second likelihood score associated with a final key phrase state of the key phrase model corresponding to an end of a second portion of the key phrase;
  detect the predetermined key phrase in the received audio input based on the rejection likelihood score and the key phrase likelihood score; and
  provide a wake indicator or a command in response to the detected predetermined key phrase.

22. The system of claim 21, wherein the first likelihood score is a maximum first likelihood score attained at the first key phrase state over a particular time interval and the second likelihood score is a maximum second likelihood score attained at the final key phrase state over the particular time interval.

23. The system of claim 21, wherein the first likelihood score corresponds to a first time instance, the second likelihood score corresponds to a second time instance, and the digital signal processor to determine whether the received audio input is associated with the predetermined key phrase comprises the digital signal processor to verify the second time instance is subsequent to the first time instance.

24. The system of claim 21, wherein the first key phrase state corresponds to an endpoint of a first word of the key phrase model and the final key phrase state corresponds to an endpoint of a second word of the key phrase model.

* * * * *